United States Patent
Akiyama

(10) Patent No.: US 11,150,150 B2
(45) Date of Patent: Oct. 19, 2021

(54) DYNAMOMETER CONTROL DEVICE

(71) Applicant: Meidensha Corporation, Tokyo (JP)

(72) Inventor: Takao Akiyama, Tokyo (JP)

(73) Assignee: MEIDENSHA CORPORATION, Tokyo (JP)

( * ) Notice: Subject to any disclaimer, the term of this patent is extended or adjusted under 35 U.S.C. 154(b) by 0 days.

(21) Appl. No.: 17/272,615

(22) PCT Filed: Jun. 28, 2019

(86) PCT No.: PCT/JP2019/025976
§ 371 (c)(1),
(2) Date: Mar. 1, 2021

(87) PCT Pub. No.: WO2020/049845
PCT Pub. Date: Mar. 12, 2020

(65) Prior Publication Data
US 2021/0247251 A1    Aug. 12, 2021

(30) Foreign Application Priority Data
Sep. 7, 2018 (JP) .............................. JP2018-168332

(51) Int. Cl.
*G01M 15/02* (2006.01)
*G01L 3/04* (2006.01)
(Continued)

(52) U.S. Cl.
CPC ............. *G01L 3/045* (2013.01); *G01L 5/0042* (2013.01); *G01M 15/02* (2013.01); *G05B 11/40* (2013.01)

(58) Field of Classification Search
CPC ....... G01L 3/045; G01L 5/0042; G05B 11/40; G01M 15/02
See application file for complete search history.

(56) References Cited

U.S. PATENT DOCUMENTS 6,768,940 B2 * 7/2004 Akiyama ............ G01M 15/044
                                                          701/114
9,116,062 B2 * 8/2015 Akiyama .................. G01L 3/24
(Continued)

FOREIGN PATENT DOCUMENTS

JP            3775284 B2      5/2006
JP        2006-242593 A      9/2006
(Continued)

*Primary Examiner* — Freddie Kirkland, III
(74) *Attorney, Agent, or Firm* — Muncy, Geissler, Olds & Lowe, P.C.

(57) ABSTRACT

In the present invention, an input-side control device generates an input-side torque command signal Tr using an engine torque command signal, an input-side velocity detection signal ω, and an input-side shaft torque detection signal Tsh, and is provided with: a shaft torque controller that generates a torque command signal on the basis of the engine torque command signal and an input shaft torque detection signal; and an inertia compensator that feeds back an inertia compensation signal generated by multiplying a set inertia value Jset by the input-side velocity detection signal. The shaft torque controller is provided with a first low-pass filter that, from the engine torque command signal, allows a high-frequency component to decay; and the inertia compensator is provided with a second low-pass filter that, from the input-side velocity detection signal, allows a high-frequency component to decay.

19 Claims, 12 Drawing Sheets

(51) Int. Cl.
*G01L 5/00* (2006.01)
*G05B 11/40* (2006.01)

(56) References Cited

U.S. PATENT DOCUMENTS

| | | | | |
|---|---|---|---|---|
| 9,234,820 B2* | 1/2016 | Akiyama | ............... | G01M 15/00 |
| 10,041,858 B2* | 8/2018 | Akiyama | ............ | G01M 15/044 |
| 10,371,589 B2* | 8/2019 | Akiyama | ............... | G01L 25/006 |
| 10,451,522 B2* | 10/2019 | Sugita | ........................ | G01P 3/36 |
| 10,558,179 B2* | 2/2020 | Akiyama | ............... | G01M 15/02 |
| 10,605,689 B2* | 3/2020 | Akiyama | ............ | G01M 15/046 |
| 10,892,695 B2* | 1/2021 | Tadano | .................... | H02P 21/05 |
| 10,895,511 B2* | 1/2021 | Yamaguchi | ......... | G01M 13/025 |
| 2003/0088345 A1 | 5/2003 | Akiyama et al. | | |
| 2015/0142341 A1 | 5/2015 | Akiyama et al. | | |
| 2015/0219529 A1 | 8/2015 | Akiyama et al. | | |
| 2020/0200627 A1 | 6/2020 | Takahashi | | |
| 2020/0271539 A1 | 8/2020 | Akiyama | | |

FOREIGN PATENT DOCUMENTS

| | | |
|---|---|---|
| JP | 2013-257234 A | 12/2013 |
| JP | 2016-070786 A | 5/2016 |
| JP | 2016-206177 A | 12/2016 |
| JP | 2017-175378 A | 9/2017 |
| JP | 6369596 B1 | 8/2018 |
| JP | 6390774 B1 | 9/2018 |
| JP | 2019-052862 A | 4/2019 |
| WO | WO-2014/010409 A1 | 6/2016 |

\* cited by examiner

_(12) United States Patent Document — US 11,150,150 B2_

DYNAMOMETER CONTROL DEVICE

TECHNICAL FIELD

The present invention relates to a dynamometer control device. More specifically, the present invention relates to a dynamometer control device that performs an electrical inertia control in a test system that is provided with a test sample including an input shaft and an output shaft, such as a drive train for a vehicle, and that includes a dynamometer coupled to the input shaft of the test sample.

BACKGROUND ART

A drive train is a generic term for a plurality of devices that transmit energy generated by an engine to drive wheels. A drive train includes, for example, an engine, a clutch, a transmission, drive shafts, a propeller shaft, a differential gear, and drive wheels. In a test system for a drive train, a transmission is actually driven by an engine. An electrical inertia control is then performed for an output-side dynamometer coupled to an output shaft of the drive train. Meanwhile load torque resembling inertia of a tire or a vehicle body is applied to the output shaft to evaluate durable performance, quality, and other features of the drive train (for example, see Patent Document 1). Recently, such a test system that causes, instead of an actual engine, an input-side dynamometer to generate drive torque as input to an input shaft of a drive train has been proposed (for example, see Patent Document 2).

By the way, an actual moment of inertia of an input-side dynamometer (hereinafter also referred to as a "dynamometer moment of inertia") differs from a moment of inertia of an actual engine, which the dynamometer moment of inertia intends to resemble. More specifically, a dynamometer moment of intertia is greater than a moment of intertia of an actual engine. To improve reproducibility of a test, it is therefore necessary to further perform a low-inertia realizing control under which an input-side dynamometer is controlled as if a dynamometer moment of inertia corresponds to a set moment of inertia that is set to have a smaller value than a value of the dynamometer moment of inertia. Patent Document 3 describes a dynamometer control device that performs a low-inertia realizing control for an input-side dynamometer.

Patent Document 1: PCT International Publication No. WO 2014/010409

Patent Document 2: Japanese Unexamined Patent Application, Publication No. 2013-257234

Patent Document 3: Japanese Patent Application No. 2017-175378

DISCLOSURE OF THE INVENTION

Problems to be Solved by the Invention

By the way, in the dynamometer control device described in Patent Document 3, a torque command signal output part is provided with a low-pass filter that causes a high-frequency component, which is higher than a cut-off frequency of approximately 20 Hz, to decay to prevent the low-inertia realizing control from becoming unstable due to torsional vibration of an input shaft. In the dynamometer control device described in Patent Document 3, the low-pass filter therefore rate-limits responsiveness of an electrical inertia control, making it impossible to achieve an electrical inertia control with responsiveness at a frequency higher than the cut-off frequency of the low-pass filter.

An object of the present invention is to provide a dynamometer control device that makes it possible to perform, in a test system including an input-side dynamometer coupled to an input shaft of a test sample including the input shaft and an output shaft, a low-inertia realizing control that is highly responsive with respect to the input-side dynamometer. Means for Solving the Problems (1) A test system (for example, test systems 1 and LA, described later) includes: a dynamometer (for example, input-side dynamometers 21 and 21A, described later) coupled to an input shaft (for example, an input shaft SI, described later) of a test sample (for example, a test sample W, described later) including the input shaft and an output shaft (for example, output shafts SO1 and SO2, described later); an inverter (for example, input-side inverters 22 and 22A, described later) that supplies, to the dynamometer, electric power corresponding to a torque command signal; a velocity detector (for example, an input-side encoder 23, described later) that generates a velocity detection signal corresponding to a rotational velocity of the dynamometer; and a shaft torque detector (for example, an input-side shaft torque meter 24, described later) that generates a shaft torque detection signal corresponding to shaft torque acting on the input shaft. A dynamometer control device (for example, input-side control devices 5 and 5A, described later) according to the present invention uses a higher command signal with respect to the torque command signal, the velocity detection signal, and the shaft torque detection signal to generate the torque command signal. The dynamometer control device includes: a shaft torque controller (for example, shaft torque controllers 51 and 51A, described later) that generates the torque command signal based on the higher command signal and the shaft torque detection signal; and an inertia compensator (for example, an inertia compensator 52, described later) that feeds back, to the shaft torque controller, an inertia compensation signal generated by multiplying a set inertia value by the velocity detection signal. The shaft torque controller includes a first low-pass filter (for example, a first low-pass filter 511, described later) that, from the higher command signal, allows a high-frequency component to decay and a low-frequency component to pass. The inertia compensator includes a second low-pass filter (for example, a second low-pass filter 521, described later) that, from the velocity detection signal, allows a high-frequency component to decay and a low-frequency component to pass.

(2) In this case, input-output characteristics of the first low-pass filter and the second low-pass filter are preferably set to satisfy a below polynomial Pc(s) where a characteristic polynomial of a closed-loop transfer function used in a control circuit configured in the shaft torque controller and the inertia compensator is characterized by a response frequency fc that is set lower than a resonance frequency of the input shaft and predetermined coefficients c1, c2, and c3.

$$Pc(s) = 1 + c1\left(\frac{s}{2\pi fc}\right) + c2\left(\frac{s}{2\pi fc}\right)^2 + c3\left(\frac{s}{2\pi fc}\right)^3 \quad (1)$$

(3) In this case, a denominator polynomial of a transfer function used in the first low-pass filter is preferably equal to a denominator polynomial of a transfer function used in the second low-pass filter, and a degree of a numerator polynomial of the transfer function used in the second low-pass filter is greater than a degree of a numerator polynomial of the transfer function used in the first low-pass filter.

(4) In this case, the shaft torque controller preferably includes: a deviation operation part (for example, a deviation operation part 512, described later) that calculates a deviation between the higher command signal that has passed the first low-pass filter and the shaft torque detection signal; an integration operation part (for example, an integration operation part 513, described later) that integrates the deviation; a gain multiplication part (for example, a gain multiplication part 515, described later) that multiplies, by a predetermined integration gain, one that is acquired by subtracting an output signal of the inertia compensator from an output signal of the integration operation part; a non-integration operation part (for example, a non-integration operation part 516, described later) that performs a non-integration operation on the deviation; and an addition part (for example, an addition part 517, described later) that determines, as the torque command signal, a sum of an output signal of the non-integration operation part and an output signal of the gain multiplication part. In here, a transfer function Ge0(s) used in the non-integration operation part, where Ki is the integration gain, s is a Laplace operator, and Ge(s) is a transfer function that outputs a torque command signal that causes, when the deviation is inputted, the deviation to disappear, is set to satisfy a below equation.

$$Ge(s) = \frac{Ki}{s} + Ge0(s) \qquad (2)$$

(5) In this case, the transfer function Ge(s) is preferably designed based on a control system design method that is referred to as a μ design method or an H∞ control design method.

(6) In this case, the dynamometer (for example, the input-side dynamometer 21A, described later) is preferably a tandem dynamometer including a first dynamometer (for example, a front dynamometer 21F, described later) coupled to the input shaft, and a second dynamometer (for example, a rear dynamometer 21R, described later) coupled to an output shaft of the first dynamometer. The torque command signal also preferably contains a first torque command signal (for example, a front torque command signal Trf, described later) for the first dynamometer, and a second torque command signal (for example, a rear torque command signal Trr, described later) for the second dynamometer.

(7) In this case, the shaft torque controller (for example, the shaft torque controller 51A, described later) preferably includes: a deviation operation part (for example, a deviation operation part 512, described later) that calculates a deviation between the higher command signal that has passed the first low-pass filter and the shaft torque detection signal; an integration operation part (for example, an integration operation part 513, described later) that integrates the deviation; a first gain multiplication part (for example, a front gain multiplication part 515F, described later) that multiplies, by a predetermined first integration gain (for example, a front integration gain Kif, described later), one that is acquired by subtracting the inertia compensation signal from an output signal of the integration operation part; a second gain multiplication part (for example, a rear gain multiplication part 515R, described later) that multiplies, by a predetermined second integration gain (for example, a rear integration gain Kir, described later), one that is acquired by subtracting the inertia compensation signal from the output signal of the integration operation part; a first non-integration operation part (for example, a front non-integration operation part 516F, described later) that performs a first non-integration operation on the shaft torque detection signal; a second non-integration operation part (for example, a rear non-integration operation part 516R, described later) that performs a second non-integration operation on the shaft torque detection signal; a first addition part (for example, a front addition part 517F, described later) that determines, as the first torque command signal (for example, a front torque command signal Trf, described later), a sum of an output signal of the first non-integration operation part and an output signal the first gain multiplication part; and a second addition part (for example, a rear addition part 517R, described later) that determines, as the second torque command signal (for example, a rear torque command signal Trr, described later), a sum of an output signal of the second non-integration operation part and an output signal of the second gain multiplication part. In here, a transfer function Gyf0(s) used in the first non-integration operation part, where Kif is the first integration gain, s is a Laplace operator, and Gyf(s) is a transfer function that outputs a torque command signal that causes, when the shaft torque detection signal is inputted, the deviation to disappear, is set to satisfy a below equation (3-1). A transfer function Gyr0(s) used in the second non-integration operation part, where Kir is the second integration gain, and Gyr(s) is a transfer function that outputs a torque command signal that causes, when the shaft torque detection signal is inputted, the deviation to disappear, is set to satisfy a below equation (3-2).

$$Gyf(s) = \frac{Kif}{s} + Gyf0(s) \qquad (3\text{-}1)$$

$$Gyr(s) = \frac{Kir}{s} + Gyr0(s) \qquad (3\text{-}2)$$

(8) In this case, the transfer functions Gyf(s) and Gyr(s) are preferably designed based on a control system design method that is referred to as a μ design method or an H∞ control design method.

Effects of the Invention (1) In the dynamometer control device according to the present invention, the shaft torque controller that generates a torque command signal based on a higher command signal and a shaft torque detection signal, and the inertia compensator that feeds back, to the shaft torque controller, an inertia compensation signal generated by multiplying a set inertia value by a velocity detection signal are used to generate a torque command signal. The torque command signal is used to perform an electrical inertia control that controls the dynamometer as if a moment of inertia of the dynamometer corresponds to a set inertia. In here, the shaft torque controller includes the first low-pass filter that, from a higher command signal, allows a high-frequency component to decay and a low-frequency component to pass. The inertia compensator includes the second low-pass filter that, from a velocity detection signal, allows a high-frequency component to decay and a low-frequency component to pass. In the present invention, adjusting the input-output characteristics of the first and second low-pass filters respectively provided in the shaft torque controller and the inertia compensator makes it possible to achieve a highly responsive electrical inertia control.

(2) In the dynamometer control device according to the present invention, the input-output characteristics of the first low-pass filter and the second low-pass filter are set to satisfy the above polynomial Pc(s) where the characteristic polynomial of the closed-loop transfer function used in the control circuit configured in the shaft torque controller and the inertia compensator is characterized by the response frequency fc that are set lower than a resonance frequency of an input shaft and the predetermined coefficients c1, c2, and c3. According to the present invention, setting the input-output characteristics of the first and second low-pass filters as described above makes it possible to improve responsiveness of an electrical inertia control performed by the shaft torque controller and the inertia compensator at or around a frequency closer to the response frequency fc.

(3) In the dynamometer control device according to the present invention, the denominator polynomial of the transfer function used in the first low-pass filter and the denominator polynomial of the transfer function used in the second low-pass filter are made equal to each other. Furthermore, the degree of the numerator polynomial of the transfer function used in the second low-pass filter is made greater than the degree of the numerator polynomial of the transfer function used in the first low-pass filter. According to the present invention, setting the transfer functions that characterize the input-output characteristics of the first and second low-pass filters as described above makes it possible to achieve a highly responsive electrical inertia control.

(4) In the dynamometer control device according to the present invention, the shaft torque controller uses, to generate a torque command signal: the deviation operation part that calculates a deviation between a higher command signal and a shaft torque detection signal; the integration operation part that integrates the deviation; the gain multiplication part that multiplies, by an integration gain, one that is acquired by subtracting an inertia compensation signal from an output signal of the integration operation part; the non-integration operation part that performs the non-integration operation characterized by the transfer function Ge0(s) defined by the above equation (2); and the addition part that determines, as a torque command signal, a sum of an output signal of the non-integration operation part and an output signal of the gain multiplication part. In the dynamometer control device according to the present invention, providing the non-integration operation part to the shaft torque controller makes it possible, while suppressing mechanical resonance due to torsional vibration of an input shaft from occurring, to achieve a highly responsive electrical inertia control.

(5) In the present invention, designing the transfer function Ge(s), which is required to derive the transfer function Ge0(s) used in the non-integration operation part based on the above equation (2), based on a control system design method that is referred to as the μ design method or the H∞ control design method makes it possible to achieve a highly responsive electrical inertia control with a high resonance suppression effect.

(6) In the present invention, a dynamometer subject to control by the dynamometer control device is a tandem dynamometer where a first dynamometer and a second dynamometer are coupled in series to each other. Such a tandem dynamometer as described above is advantageous, even though it is necessary to generate large drive torque, for example, in a case where it is difficult to increase in diameter a dynamometer due to layout restrictions relating to a shape of a test sample, for example. According to the present invention, even when such a tandem dynamometer as described above is subject to control, adjusting the input-output characteristics of the first and second low-pass filters makes it possible to achieve a highly responsive electrical inertia control.

(7) In the dynamometer control device according to the present invention, the shaft torque controller uses, to generate first and second torque command signals: the deviation operation part that calculates a deviation between a higher command signal and a shaft torque detection signal; the integration operation part that integrates the deviation; the integration operation part that integrates the deviation; the first and second gain multiplication parts that respectively multiply, by first and second integration gains, ones that are each acquired by subtracting an inertia compensation signal from an output signal of the integration operation part; the first non-integration operation part that performs a first non-integration operation characterized by the transfer function Gyf0(s) defined by the above equation (3-1); the second non-integration operation part that performs a second non-integration operation characterized by the transfer function Gyr0(s) defined by the above equation (3-2); the first addition part that determines, as a first torque command signal, a sum of an output signal of the first non-integration operation part and an output signal of the first gain multiplication part; and the second addition part that determines, as a second torque command signal, a sum of an output signal of the second non-integration operation part and an output signal of the second gain multiplication part. In the dynamometer control device according to the present invention, providing the first and second non-integration operation parts in the shaft torque controller makes it possible, while suppressing mechanical resonance due to torsional vibration of an input shaft between the tandem dynamometer and a test sample, to achieve a highly responsive electrical inertia control.

(8) In the present invention, designing the transfer functions Gyf(s) and Gyr(s), which are respectively required to derive the transfer function Gyf0(s) used in the first non-integration operation part and the transfer function Gyr0(s) used in the second non-integration operation part based on the above equations (3-1) and (3-2), based on a control system design method that is referred to as the μ design method or the H∞ control design method makes it possible, even when a tandem dynamometer is subject to control, to achieve a highly responsive electrical inertia control with a high resonance suppression effect.

PREFERRED MODE FOR CARRYING OUT THE INVENTION

First Embodiment

Figure 1:
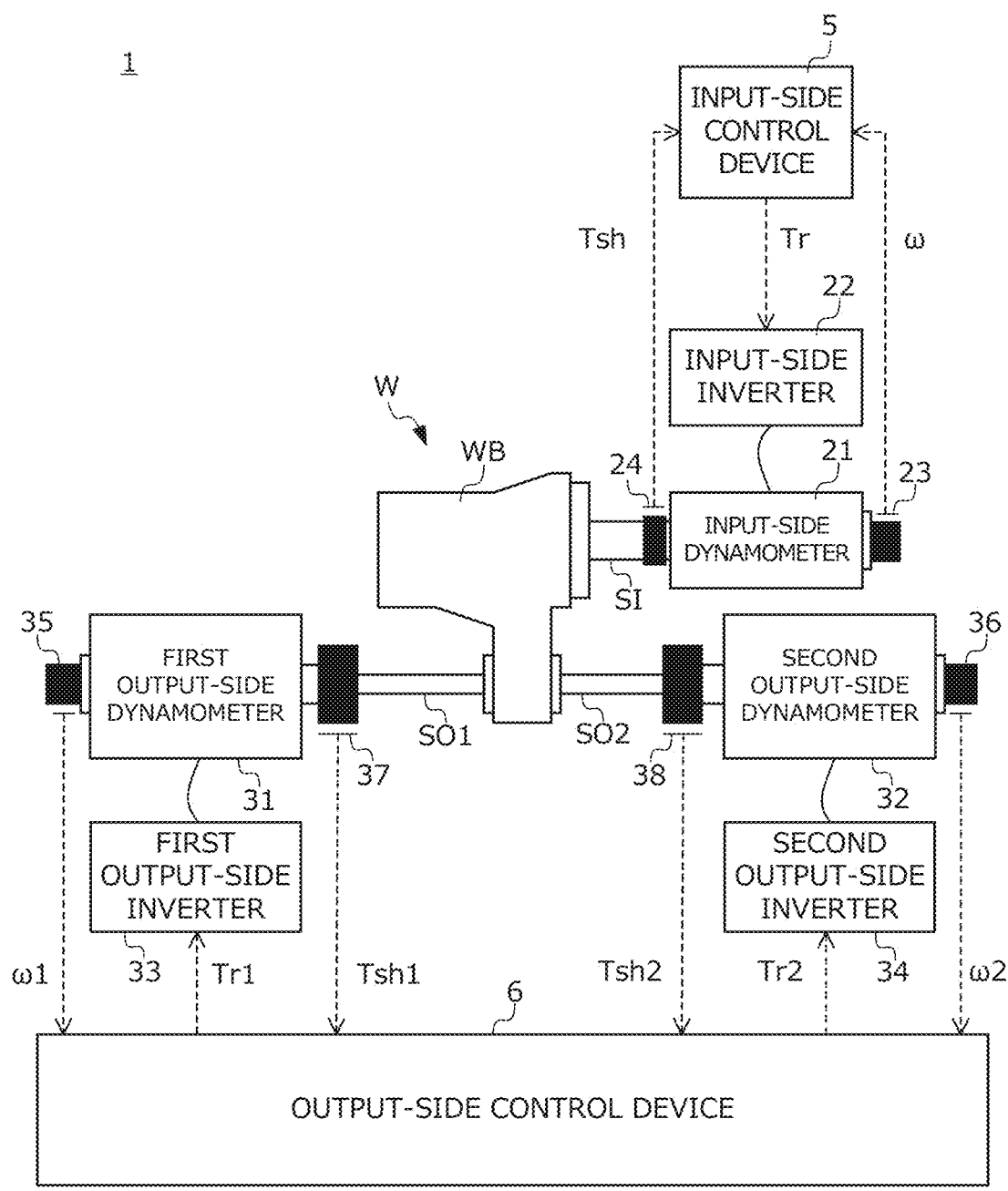
FIG. 1 is a view illustrating a configuration of a test system for a drive train, when the test system is applied with an input-side control device according to a first embodiment of the present invention.

A first embodiment of the present invention will now be described herein in detail with reference to the accompanying drawings. FIG. 1 is a view illustrating a configuration of a test system 1 for a drive train, when the test system 1 is applied with an input-side control device 5 according to the embodiment. Note that, although FIG. 1 illustrates an example of the test system 1 when a drive train of a front-engine, front-drive (FF) vehicle serves as a test sample W, the present invention is not limited to the example. A test sample may be a drive train for a front-engine, rear-drive (FR) vehicle, for example.

The test sample W includes an input shaft SI to be coupled to a non-illustrated engine when the test sample W is mounted in a completed vehicle, left and right output shafts SO1 and SO2 serving as drive shafts, and a main body WB that is assembled with a clutch, a transmission, a differential gear, and other components, and that transmits drive power that is inputted from the input shaft SI to the output shafts SO1 and SO2.

The test system 1 includes an input-side dynamometer 21, an input-side inverter 22, an input-side encoder 23, an input-side shaft torque meter 24, a first output-side dynamometer 31, a second output-side dynamometer 32, a first output-side inverter 33, a second output-side inverter 34, a first output-side encoder 35, a second output-side encoder 36, a first output-side shaft torque meter 37, a second output-side shaft torque meter 38, the input-side control device 5, and an output-side control device 6.

An output shaft of the input-side dynamometer 21 is coupled to the input shaft SI of the test sample W. When an input-side torque command signal Tr generated through a procedure described later is inputted from the input-side control device 5, the input-side inverter 22 supplies, to the input-side dynamometer 21, electric power corresponding to the input-side torque command signal Tr. The input-side encoder 23 detects a rotational velocity of the output shaft of the input-side dynamometer 21 (a rotating speed of the shaft per unit time) to generate an input-side velocity detection signal ω corresponding to the rotational velocity. The input-side velocity detection signal ω is inputted to the input-side control device 5. The input-side shaft torque meter 24 detects shaft torque acting on the input shaft SI from an amount of deformation in a shaft twisting direction, for example, to generate an input-side shaft torque detection signal Tsh corresponding to the shaft torque. The input-side shaft torque detection signal Tsh is inputted to the input-side control device 5.

An output shaft of the first output-side dynamometer 31 is coupled to the output shaft SO1 of the test sample W. When a first output-side torque command signal Tr1 generated through a procedure described later is inputted from the output-side control device 6, the first output-side inverter 33 supplies, to the first output-side dynamometer 31, electric power corresponding to the first output-side torque command signal Tr1. The first output-side encoder 35 detects a rotational velocity of the output shaft of the first output-side dynamometer 31 to generate a first output-side velocity detection signal ω1 corresponding to the rotational velocity. The first output-side velocity detection signal ω1 is inputted to the output-side control device 6. The first output-side shaft torque meter 37 detects shaft torque acting on the output shaft SO1 from an amount of deformation in the shaft twisting direction, for example, to generate a first output-side shaft torque detection signal Tsh1 corresponding to the shaft torque. The first output-side shaft torque detection signal Tsh1 is inputted to the output-side control device 6.

An output shaft of the second output-side dynamometer 32 is coupled to the output shaft SO2 of the test sample W. When a second output-side torque command signal Tr2 generated through a procedure described later is inputted from the output-side control device 6, the second output-side inverter 34 supplies, to the second output-side dynamometer 32, electric power corresponding to the second output-side torque command signal Tr2. The second output-side encoder 36 detects a rotational velocity of the output shaft of the second output-side dynamometer 32 to generate a second output-side velocity detection signal ω2 corresponding to the rotational velocity. The second output-side velocity detection signal ω2 is inputted to the output-side control device 6. The second output-side shaft torque meter 38 detects shaft torque acting on the output shaft SO2 from an amount of deformation in the shaft twisting direction, for example, to generate a second output-side shaft torque detection signal Tsh2 corresponding to the shaft torque. The second output-side shaft torque detection signal Tsh2 is inputted to the output-side control device 6.

The input-side control device 5 uses input signals such as the input-side velocity detection signal ω and the input-side shaft torque detection signal Tsh, following the procedure described later with reference to FIG. 4 and other drawings, generates the input-side torque command signal Tr, and inputs the input-side torque command signal Tr to the input-side inverter 22. Therefore, the input-side control device 5 causes the input-side dynamometer 21 to generate drive torque resembling drive torque of the engine in the completed vehicle mounted with the test sample W to drive the input shaft SI of the test sample W.

The output-side control device 6 uses input signals such as the first and second output-side velocity detection signals ω1 and ω2 and the first and second output-side shaft torque detection signals Tsh1 and Tsh2, following the procedure described later with reference to FIGS. 2 and 3 and other drawings, generates the first and second output-side torque command signals Tr1 and Tr2, and inputs the first and second output-side torque command signals Tr1 and Tr2 respectively to the first and second output-side inverters 33 and 34. Therefore, the output-side control device 6 applies, to the output shafts SO1 and SO2 of the test sample W, loads resembling tire inertia and vehicle body inertia on the completed vehicle mounted with the test sample W.

In the test system 1, the input-side control device 5 drives the input shaft SI of the test sample W, and the output-side control device 6 applies, to the output shafts SO1 and SO2 of the test sample W, loads resembling the tire inertia and the vehicle body inertia to evaluate durable performance, quality, and other features of the test sample W under similar conditions to conditions when the actual vehicle is running.

Figure 2:
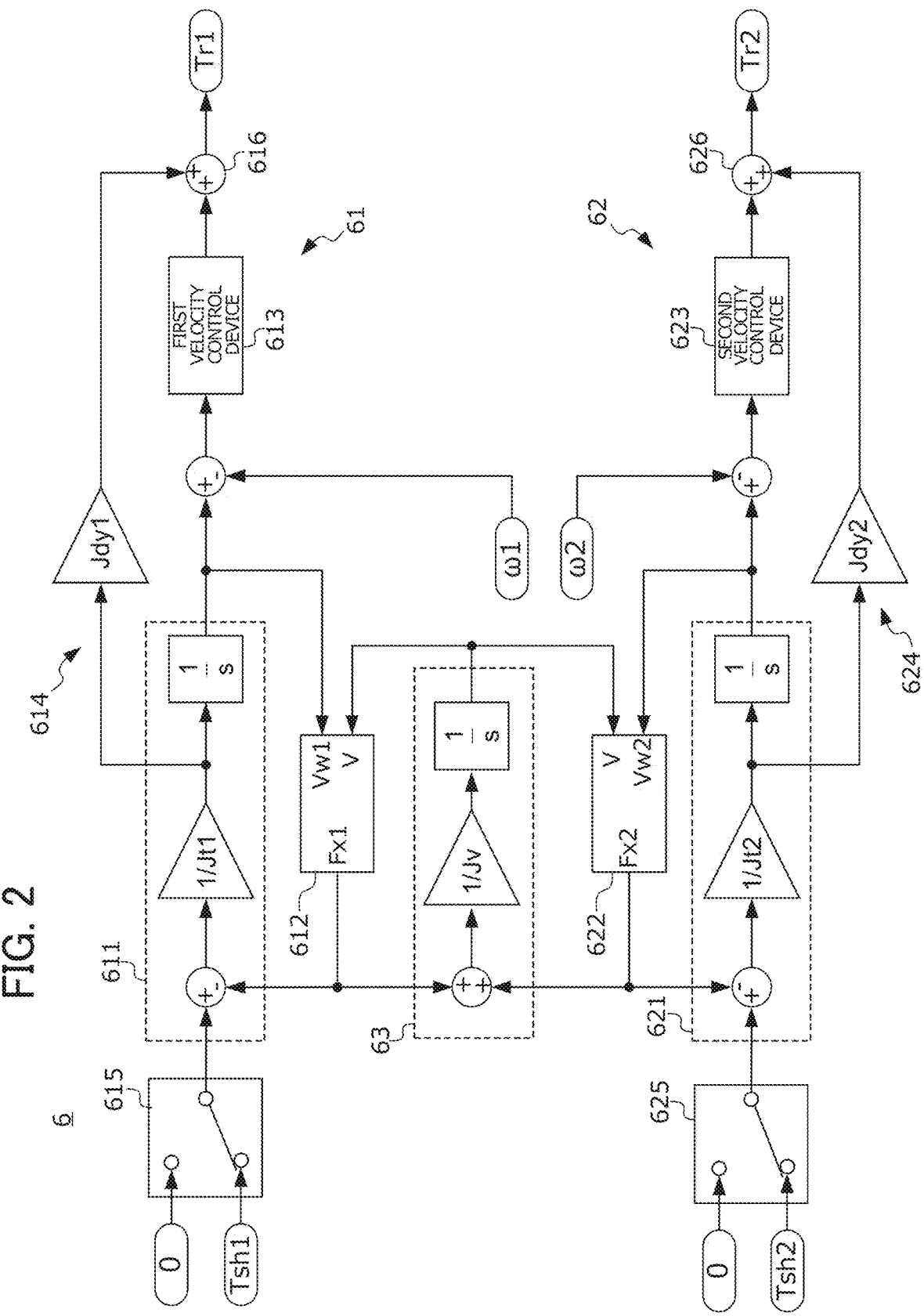
FIG. 2 is a block diagram illustrating a configuration of a control circuit in an output-side control device.
Figure 3:
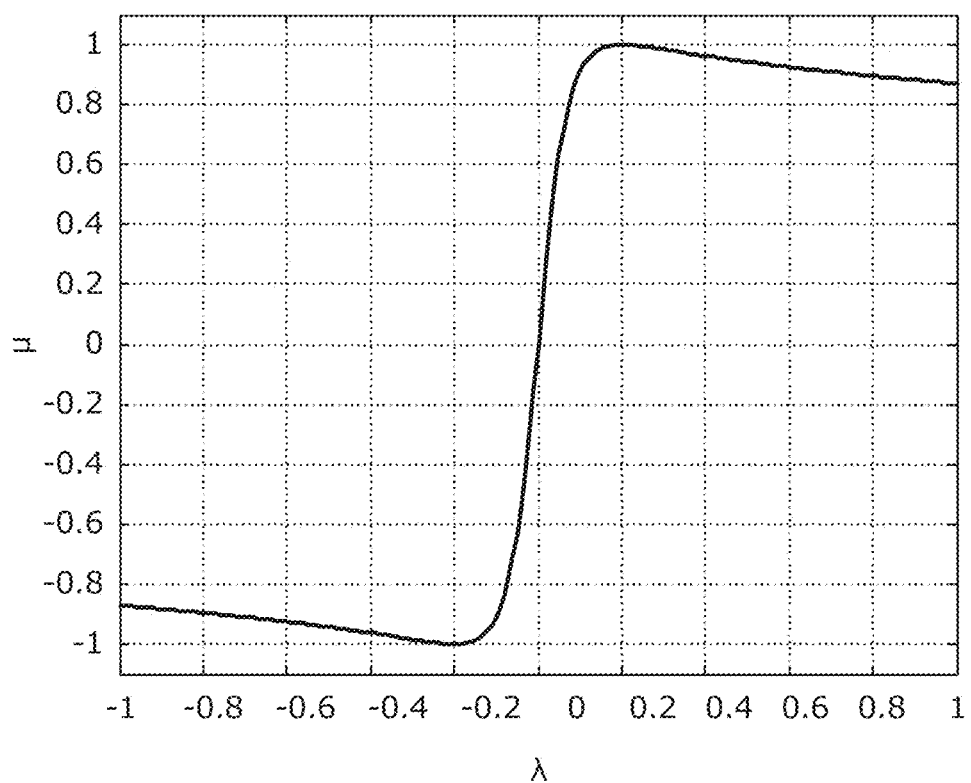
FIG. 3 is an example of a control map used to determine a friction coefficient value.

FIG. 2 is a block diagram illustrating a configuration of a control circuit in the output-side control device 6. The output-side control device 6 includes a first control circuit 61 that generates the first output-side torque command signal Tr1 based on the first output-side velocity detection signal ω1 and the first output-side shaft torque detection signal Tsh1, a second control circuit 62 that generates the second output-side torque command signal Tr2 based on the second output-side velocity detection signal ω2 and the second output-side shaft torque detection signal Tsh2, and a vehicle velocity operation part 63 that virtually calculates a velocity of the vehicle mounted with the test sample W.

The first control circuit 61 includes a first tire velocity operation part 611, a first vehicle drive torque operation part 612, a first velocity control device 613, a first feed-forward input operation part 614, a first shaft torque input selector 615, and a first synthesizing part 616. The second control circuit 62 includes a second tire velocity operation part 621, a second vehicle drive torque operation part 622, a second velocity control device 623, a second feed-forward input operation part 624, a second shaft torque input selector 625, and a second synthesizing part 626.

The vehicle velocity operation part 63 accepts, as inputs, a first vehicle drive torque signal Fx1, described later, corresponding to a vehicle driving force generated due to a frictional force between a virtual first tire and a virtual first road surface and a second vehicle drive torque signal Fx2, described later, corresponding to a vehicle driving force generated due to a frictional force between a virtual second tire and a virtual second road surface, uses an equation of motion for the vehicle (see a below equation (4)), which is characterized by a moment of inertia Jv of the virtual vehicle that runs when the first and second tires described above serve as drive wheels, and generates a vehicle velocity signal V corresponding to a velocity of the vehicle.

$$Fx1 + Fx2 = Jv \cdot \frac{dV}{dt} \tag{4}$$

More specifically, the vehicle velocity operation part 63 adds the first vehicle drive torque signal Fx1 generated by the first vehicle drive torque operation part 612 and the second vehicle drive torque signal Fx2 generated by the second vehicle drive torque operation part 622 to acquire a signal, multiplies a value of the acquired signal by an inverse number of a value of the vehicle moment of inertia Jv, and performs an integration operation on the resultant value to generate the vehicle velocity signal V.

The first shaft torque input selector 615 selectively switches an input to the first tire velocity operation part 611 between the first output-side shaft torque detection signal Tsh1 and a signal having a value of 0. The first shaft torque input selector 615 selects, as an input to the first tire velocity operation part 611, the first output-side shaft torque detection signal Tsh1 in a normal case or a signal having a value of 0 when a stall test is to be performed.

The first tire velocity operation part 611 accepts, as inputs, the first output-side shaft torque detection signal Tsh1 and the first vehicle drive torque signal Fx1, uses an equation of motion for the first tire (see a below equation (5)), which is characterized by a moment of inertia Jt1 of the first tire, and generates a first tire velocity signal Vw1 corresponding to a rotational velocity of the first tire.

$$Tsh1 - Fx1 = Jt1 \cdot \frac{dVw1}{dt} \tag{5}$$

More specifically, the first tire velocity operation part 611 subtracts the first vehicle drive torque signal Fx1 from the first output-side shaft torque detection signal Tsh1 to acquire a signal, defines the acquired signal as a first tire drive torque signal contributing to rotation of the first tire, multiplies a value of the first tire drive torque signal by an inverse number of a value of the first tire moment of inertia Jt1, performs an integration operation on the resultant value to generate the first tire velocity signal Vw1.

The second shaft torque input selector 625 selectively switches an input to the second tire velocity operation part 621 between the second output-side shaft torque detection signal Tsh2 and a signal having a value of 0. The second shaft torque input selector 625 selects, as an input to the second tire velocity operation part 621, the second output-side shaft torque detection signal Tsh2 in a normal case or a signal having a value of 0 when the stall test is to be performed.

The second tire velocity operation part 621 accepts, as inputs, the second output-side shaft torque detection signal Tsh2 and the second vehicle drive torque signal Fx2, uses an equation of motion for the second tire (see a below equation (6)), which is characterized by a moment of inertia Jt2 of the second tire, and generates a second tire velocity signal Vw2 corresponding to a rotational velocity of the second tire. Since a specific procedure of calculating the second tire velocity signal Vw2 is similar to the procedure of calculating the first tire velocity signal Vw1, its detailed description is omitted.

$$Tsh2 - Fx2 = Jt2 \cdot \frac{dVw2}{dt} \tag{6}$$

The first vehicle drive torque operation part 612 generates, based on a difference between the first tire velocity signal Vw1 and the vehicle velocity signal V, the first vehicle drive torque signal Fx1 corresponding to a vehicle driving force generated due to a frictional force between the first tire and the virtually set first road surface. The procedure will now be specifically described herein.

The first vehicle drive torque operation part 612 first calculates, based on a velocity difference (Vw1−V), and also based on the velocity signal Vw1 or V, whichever is greater, a first slip ratio λ1 of the first tire on the first road surface, based on a below equation (7-1). Next, the first vehicle drive torque operation part 612 uses, as an argument, the first slip ratio λ1 that is calculated to determine, based on a control map f1 as illustrated in FIG. 3, a first friction coefficient value μ1 between the first tire and the first road surface (see a below equation (7-2)). Note that the control map used to determine the friction coefficient value can be appropriately selected in accordance with conditions of the first road surface (for example, a snowy or dried road surface). Next, the first vehicle drive torque operation part 612 multiplies a first normal force value Nz1, at which the first tire receives a normal force from the first road surface, by the first friction coefficient value μ1 to generate the first vehicle drive torque signal Fx1 (see a below equation (7-3)). For the first normal force value Nz1, a constant set beforehand or a value estimated in accordance with the vehicle velocity signal V, for example, is used.

$$\lambda 1 = \frac{Vw1 - V}{\max(Vw1, V)} \tag{7-1}$$

$$\mu 1 = f1(\lambda 1) \tag{7-2}$$

$$Fx1 = 1 = Nz1 \cdot \mu 1 \tag{7-3}$$

The second vehicle drive torque operation part 622 accepts, as inputs, the second tire velocity signal Vw2 and the vehicle velocity signal V, and generates, based on below equations (8-1) to (8-3), the second vehicle drive torque signal Fx2 corresponding to a vehicle driving force generated due to a frictional force between the second tire and the second road surface. Since a specific procedure of generating the second vehicle drive torque signal Fx2 is similar to the procedure of generating the first vehicle drive torque signal Fx1, its detailed description is omitted.

$$\lambda 2 = \frac{Vw2 - V}{\max(Vw2, V)} \tag{8-1}$$

$$\mu 2 = f2(\lambda 2) \tag{8-2}$$

$$Fx2 = Nz2 \cdot \mu 2 \tag{8-3}$$

As described above, in the first control circuit 61 and the second control circuit 62, the first tire and the second tire respectively coupled to the output shafts SO1 and SO2 of the test sample W, and the vehicle running on the first road surface and the second road surface when the tires serve as the drive wheels are virtually set as objects respectively having the independent moments of inertia Jt1, Jt2, and Jv, and the equations of motion (4), (5), (6), (7-1) to (7-3), and (8-1) to (8-3) respectively for the moments of inertia are simultaneously established to generate the vehicle velocity signal V, the first tire velocity signal Vw1, and the second tire velocity signal Vw2.

The first velocity control device 613 generates a first feed-back control input signal allowing a deviation between the first tire velocity signal Vw1 and the first output-side velocity detection signal ω1 to disappear. The second velocity control device 623 generates a second feed-back control input signal allowing a deviation between the second tire velocity signal Vw2 and the second output-side velocity detection signal ω2 to disappear.

The first feed-forward input operation part 614 multiplies a value of a difference between the first output-side shaft torque detection signal Tsh1 and the first vehicle drive torque signal Fx1 by a coefficient acquired by dividing a value of a moment of inertia Jdy1 of the first output-side dynamometer 31 with a value of the moment of inertia Jt1 of the first tire to generate a first feed-forward control input signal. The first synthesizing part 616 adds the first feed-back control input signal generated by the first velocity control device 613 and the first feed-forward control input signal generated by the first feed-forward input operation part 614 to generate the first output-side torque command signal Tr1.

The second feed-forward input operation part 624 multiplies a value of a difference between the second output-side shaft torque detection signal Tsh2 and the second vehicle drive torque signal Fx2 by a coefficient acquired by dividing a value of a moment of inertia Jdy2 of the second output-side dynamometer 32 with a value of the moment of inertia Jt2 of the second tire to generate a second feed-forward control input signal. The second synthesizing part 626 adds the second feed-back control input signal generated by the second velocity control device 623 and the second feed-forward control input signal generated by the second feed-forward input operation part 624 to generate the second output-side torque command signal Tr2.

Figure 4:
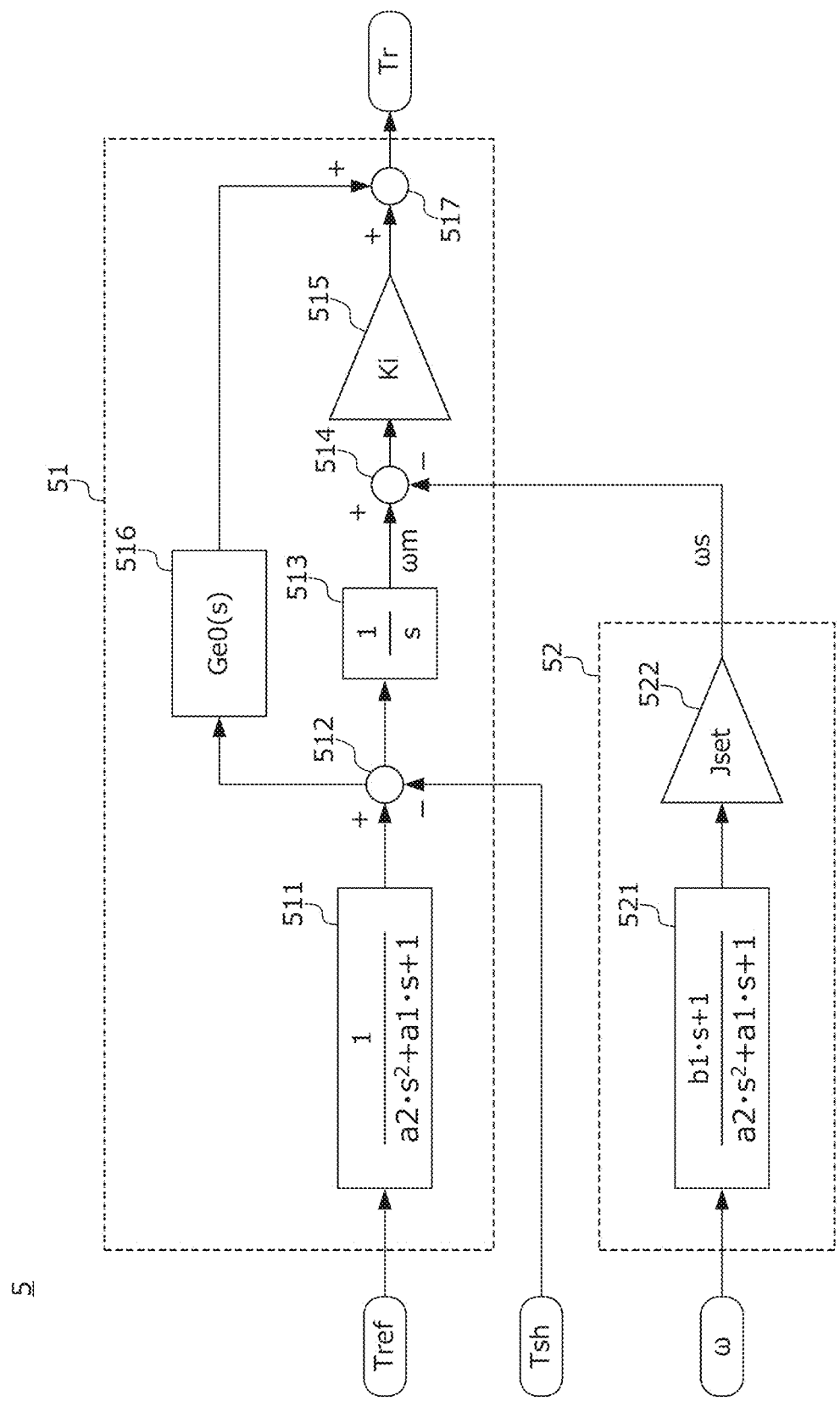
FIG. 4 is a block diagram illustrating a configuration of a control circuit in the input-side control device.

FIG. 4 is a block diagram illustrating a configuration of a control circuit in the input-side control device 5. FIG. 4 particularly illustrates, in the control circuit configured in the input-side control device 5, parts that perform an electrical inertia control for the input-side dynamometer.

The input-side control device 5 includes and uses a shaft torque controller 51 and an inertia compensator 52 to generate the input-side torque command signal Tr.

The inertia compensator 52 includes a second low-pass filter 521 and a set inertia multiplication part 522, and uses the second low-pass filter 521 and the set inertia multiplication part 522 to perform an operation on the input-side velocity detection signal ω to generate an inertia compensation signal cos. The inertia compensator 52 then feeds back the inertia compensation signal ωs in an operation performed in the shaft torque controller 51.

The second low-pass filter 521 allows, from the input-side velocity detection signal ω, a high-frequency component to decay and a low-frequency component to pass. The input-side velocity detection signal ω that has passed the second low-pass filter 521 is inputted to the set inertia multiplication part 522. A transfer function GLPF2(s) used in the second low-pass filter 521 is characterized by three filter coefficients a1, a2, and b1, as illustrated in a below equation (9). As illustrated in the below equation (9), a degree of a denominator polynomial of the transfer function GLPF2(s) used in the second low-pass filter 521 is 2, and a degree of a numerator polynomial is 1. Note that a procedure of setting values of the three filter coefficients a1, a2, and b1 that characterize an input-output characteristic of the second low-pass filter 521 will be described later in detail.

$$GLPF2 = \frac{b1 \cdot s + 1}{a2 \cdot s^2 + a1 \cdot s + 1} \tag{9}$$

The set inertia multiplication part 522 multiplies the input-side velocity detection signal ω that has passed the second low-pass filter 521 by a value of a predetermined set inertia Jset, determines the resultant value as the inertia compensation signal cos, and inputs the inertia compensation signal cos to the shaft torque controller 51. The set inertia Jset represents a moment of inertia that the input-side dynamometer 21 intends to achieve through the electrical inertia control. The set inertia Jset is set to be equivalent to a moment of inertia of the engine coupled to the input shaft SI of the test sample W when the engine is mounted in the completed vehicle. The value of the set inertia Jset is set smaller than a value of an actual moment of inertia of the input-side dynamometer 21, for example.

The shaft torque controller 51 generates the input-side torque command signal Tr based on an engine torque command signal Tref serving as a higher command signal with respect to the input-side torque command signal Tr, the input-side shaft torque detection signal Tsh, and the inertia compensation signal ωos generated by the inertia compensator 52.

The shaft torque controller 51 includes and uses a first low-pass filter 511, a deviation operation part 512, an integration operation part 513, a subtraction part 514, a gain multiplication part 515, a non-integration operation part 516, and an addition part 517 to generate the input-side torque command signal Tr.

The first low-pass filter 511 allows, from the engine torque command signal Tref, a high-frequency component to decay and a low-frequency component to pass. The engine torque command signal Tref that has passed the first low-pass filter 511 is inputted to the deviation operation part 512. A transfer function GLPF1(s) used in the first low-pass filter 511 is characterized by the two filter coefficients a1 and a2, as illustrated in a below equation (10). As illustrated in the below equation (10), a degree of a denominator polynomial of the transfer function GLPF1(s) used in the first low-pass filter 511 is 2, and a functional form of the transfer function is identical to a functional form of the denominator polynomial of the transfer function GLPF2(s) used in the second low-pass filter 521. A degree of a numerator polynomial of the transfer function GLPF1(s) used in the first low-pass filter 511 is 0. That is, the degree of the numerator polynomial of the transfer function GLPF2(s) used in the second low-pass filter 521 is greater than the degree of the numerator polynomial of the transfer function GLPF1(s) used in the first low-pass filter 511. Note that a procedure of setting values of the two filter coefficients a1 and a2 that characterize an input-output characteristic of the first low-pass filter 511 will be described later in detail.

$$GLPF1(s) = \frac{1}{a2 \cdot s^2 + a1 \cdot s + 1} \quad (10)$$

The deviation operation part 512 subtracts the input-side shaft torque detection signal Tsh from the engine torque command signal Tref that has passed the first low-pass filter 511 to calculate a deviation, and inputs the deviation to the integration operation part 513 and the non-integration operation part 516.

The integration operation part 513 integrates the deviation calculated by the deviation operation part 512 to generate a velocity signal ωm, and inputs the velocity signal ωm to the subtraction part 514.

The subtraction part 514 subtracts, from the velocity signal ωm generated by the integration operation part 513, the inertia compensation signal ωos generated by the inertia compensator 52 to generate a difference signal (ωm−ωs), and inputs the difference signal (ωm−ωs) to the gain multiplication part 515.

The gain multiplication part 515 multiplies the difference signal (ωm−ωs) generated by the subtraction part 514 by a predetermined integration gain Ki to generate a first control input signal, and inputs the first control input signal to the addition part 517.

The non-integration operation part 516 performs a non-integration operation with a transfer function Ge0(s) on the deviation calculated by the deviation operation part 512 to generate a second control input signal, and inputs the second control input signal to the addition part 517. A procedure of designing the transfer function Ge0(s) used in the non-integration operation part 516 will now be described herein.

Figure 5:
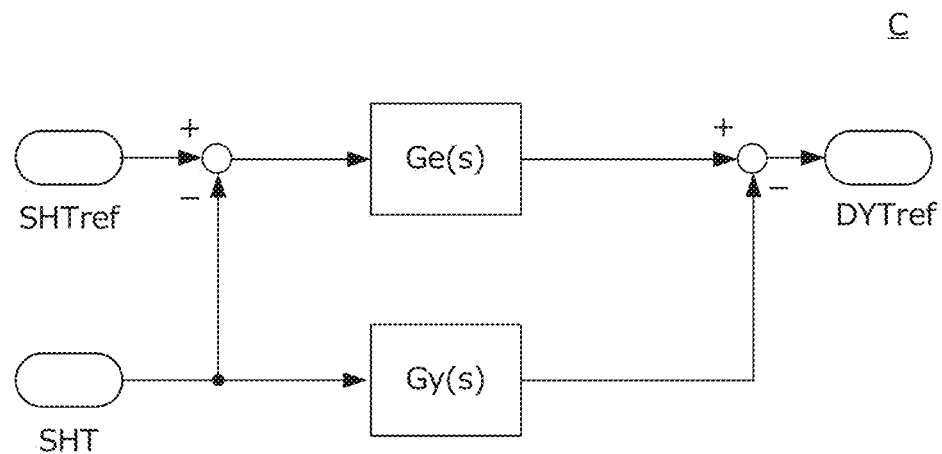
FIG. 5 is a view illustrating a configuration of a controller used to derive a transfer function Ge0(s)

FIG. 5 is a view illustrating a configuration of a controller C used to derive the transfer function Ge0(s). The controller C illustrated in FIG. 5 has a shaft torque control function to generate the input-side torque command signal Tr allowing, when the input-side shaft torque detection signal Tsh and the engine torque command signal Tref are inputted, a deviation between the input-side shaft torque detection signal Tsh and the engine torque command signal Tref (Tref−Tsh, hereinafter also simply referred to as a torque deviation) to disappear. The transfer function Ge0(s) illustrated in FIG. 4 is designed based on the controller C having two degrees of freedom illustrated in FIG. 5. For the controller C having the shaft torque control function with the two degrees of freedom, and transfer functions Ge(s) and Gy(s) configuring the controller C, as described above, the controller according to the embodiment illustrated in FIG. 6 in the Japanese Patent No. 3775284 filed by the applicant of the present application is used, for example. Note that methods of designing the transfer functions Ge(s) and Gy(s) and the controller C having the shaft torque control function are not limited to, for example, those designed based on the μ design method described in the Japanese Patent No. 3775284. For example, in addition to the μ design method, one designed based on another robust control design method such as the H∞ control design method may be used.

Now back to FIG. 4. For the transfer function Ge0(s) used in the non-integration operation part 516, one that is acquired by separating, from the transfer function Ge(s) having the shaft torque control function, as described above, an integrator of the integration gain Ki, as illustrated in a below equation (11), is used.

$$Ge(s) = \frac{Ki}{s} + Ge0(s) \quad (11)$$

The addition part 517 inputs a sum of the first control input signal generated by the gain multiplication part 515 and the second control input signal generated by the non-integration operation part 516, as the input-side torque command signal Tr, to the input-side inverter 22.

Figure 6:
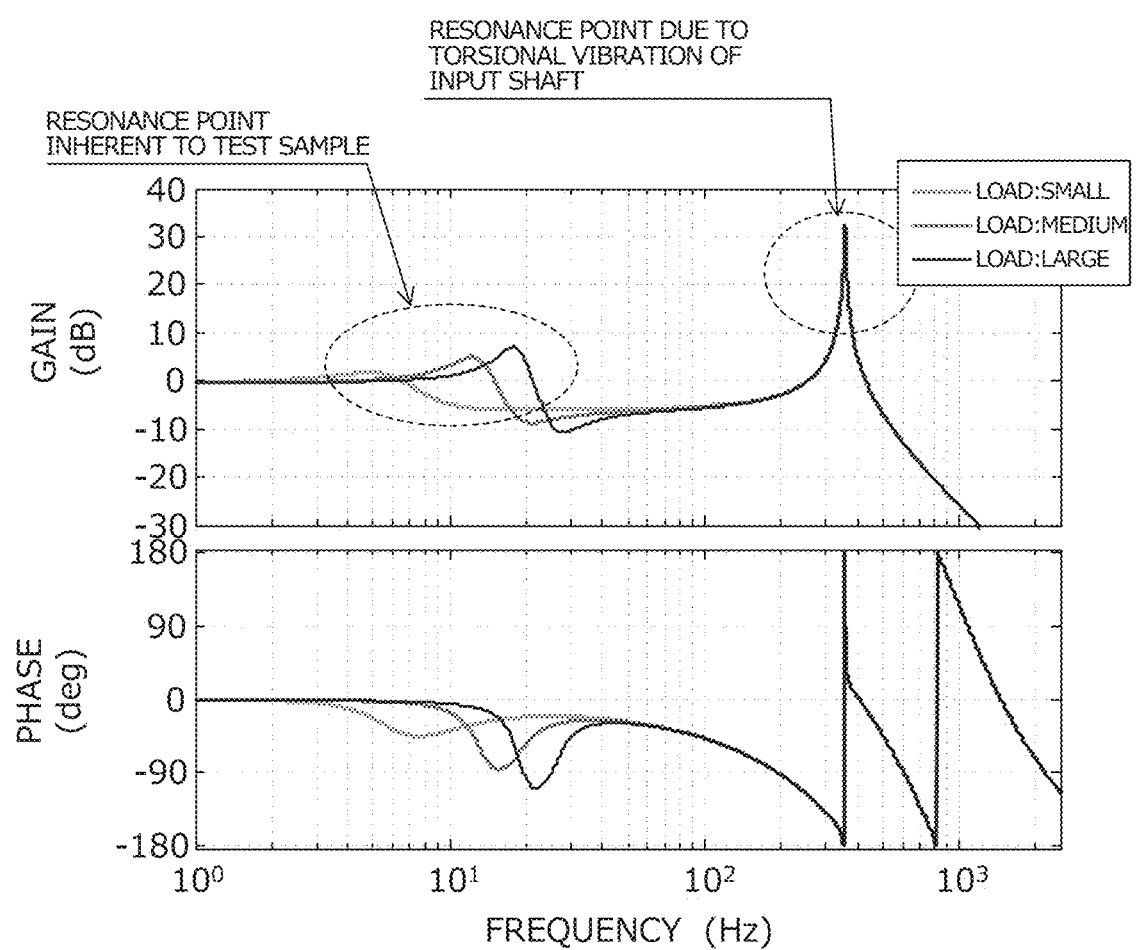
FIG. 6 is a Bode diagram illustrating a response characteristic from an input-side torque command signal to an input-side shaft torque detection signal.

FIG. 6 is a Bode diagram illustrating a response characteristic from the input-side torque command signal Tr to the input-side shaft torque detection signal Tsh. FIG. 6 illustrates, with lines different from each other in type, a case where a magnitude of a load generated in the output-side dynamometers 31 and 32 is changed in three stages of small, medium, and large. As illustrated in FIG. 6, in the test system 1 where the input shaft SI of the test sample W is coupled to the input-side dynamometer 21, and the output shafts SO1 and SO2 of the test sample W are respectively coupled to the output-side dynamometers 31 and 32, two types of resonance points are present. The resonance points relate to resonance that is occurring on a relatively low frequency side (fl=several Hz to several ten Hz) and resonance that is occurring on a relatively high frequency side (fh=approximately 400 Hz). Resonance that occurs at the resonance frequency fl on the relatively low frequency side is a phenomenon inherent to the test sample W. Resonance that occurs at the resonance frequency fh on the relatively high frequency side is a phenomenon that occurs due to torsional vibration of the input shaft SI having relatively high rigidity. The shaft torque controller 51 configured as described above uses the non-integration operation part 516 to generate the input-side torque command signal Tr to have a resonance suppressing function that suppresses resonance that appears at the resonance frequency fh on the relatively high frequency side among a plurality of resonance points as described above.

Now back to FIG. 4. The procedure of setting the filter coefficients a1, a2, and b1 that characterize the input-output characteristics of the first low-pass filter 511 and the second low-pass filter 521 will now be described herein.

The three filter coefficients a1, a2, and b1 are set to satisfy a below polynomial Pc(s) where a characteristic polynomial of a closed-loop transfer function used in the control circuit configured in the shaft torque controller 51 and the inertia compensator 52 is characterized by a predetermined response frequency fc and predetermined coefficients c1, c2, and c3. The response frequency fc is set to be fully lower than the resonance frequency fh of the input shaft SI described above. More specifically, when the resonance frequency fh is set to approximately 400 Hz, the response frequency fc is set to approximately 100 Hz, for example. Specific values of the coefficients c1, c2, and c3 are set to stably achieve the electrical inertia control by the control circuit illustrated in FIG. 4. Therefore, it is possible to improve responsiveness of the electrical inertia control performed by the input-side control device 5 at or around a frequency closer to the response frequency fc.

$$Pc(s) = 1 + c1\left(\frac{s}{2\pi fc}\right) + c2\left(\frac{s}{2\pi fc}\right)^2 + c3\left(\frac{s}{2\pi fc}\right)^3 \quad (12)$$

Below equations (13-1) to (13-3) illustrate specific setting examples of the filter coefficients a1, a2, and b1 in the input-side control device 5 according to the example. In the below equations (13-1) to (13-3), J1 is a moment of inertia from the input-side dynamometer 21 to the input-side shaft torque meter 24, and J2 is a moment of inertia of the test sample W. Design values are used for J1 and J2, respectively.

$$(2\pi fc)^2 \cdot a2 = \frac{c3 \cdot (J2 + Jset) \cdot Ki}{(J1 + J2) \cdot 2\pi fc} \quad (13\text{-}1)$$

$$2\pi fc \cdot a1 = \frac{(J2 + Jset) \cdot Ki \cdot (-c3 \cdot J2 \cdot Ki + c2 \cdot (J1 + J2) \cdot 2\pi fc)}{(J1 + J2)^2 \cdot (2\pi fc)^2} \quad (13\text{-}2)$$

$$2\pi fc \cdot b1 = [c3 \cdot J2^2 \cdot (J2 + Jset) \cdot Ki^3 + \quad (13\text{-}3)$$
$$(J1 + J2) \cdot 2\pi fc \cdot \{-c2 \cdot J2 \cdot (J2 + Jset) \cdot Ki^2 +$$
$$(J1 + J2) \cdot 2\pi fc \cdot (c1 \cdot (J2 + Jset) \cdot Ki - (J1 + J2) \cdot$$
$$2\pi fc)\}]/[(J1 + J2)^2 \cdot Jset \cdot Ki \cdot (2\pi fc)^2]$$

To derive the above equations (13-1) to (13-3), a control-target characteristic (Tsh/Tr) from the input-side torque command signal Tr to the input-side shaft torque detection signal Tsh and a control-target characteristic (ω/Tr) from the input-side torque command signal Tr to the input-side velocity detection signal ω are approximated, as illustrated in below equations (14-1) and (14-2). The below equations (14-1) and (14-2) are derived when a value of shaft rigidity is assumed to be infinite in an equation of motion in a two-inertia system acquired by coupling, with axes, a body that is subject to inertia, which is characterized by the moment of inertia J1, and a body that is subject to inertia, which is characterized by the moment of inertia J2. When the response frequency fc relating to the electrical inertia control is assumed to be fully lower than the resonance frequency fh of the input shaft SI, as described above, this approximation is regarded as reasonable.

$$\frac{Tsh}{Tr} = \frac{J2}{J1 + J2} \quad (14\text{-}1)$$

$$\frac{\omega}{Tr} = \frac{1}{(J1 + J2) \cdot s} \quad (14\text{-}2)$$

To derive the above equation (13-1) to (13-3), the transfer function Ge0(s) used in the non-integration operation part 516 is approximated to 0. Since the transfer function Ge0(s) has the resonance suppression effect of suppressing resonance at the resonance frequency fh of the input shaft SI, as described above, its gain lowers on the low frequency side than at the resonance frequency fh, that is, has a bandpass characteristic. Therefore, to derive the above equations (13-1) to (13-3), the approximation of the transfer function Ge0(s) as 0 is regarded as reasonable.

Figure 7:
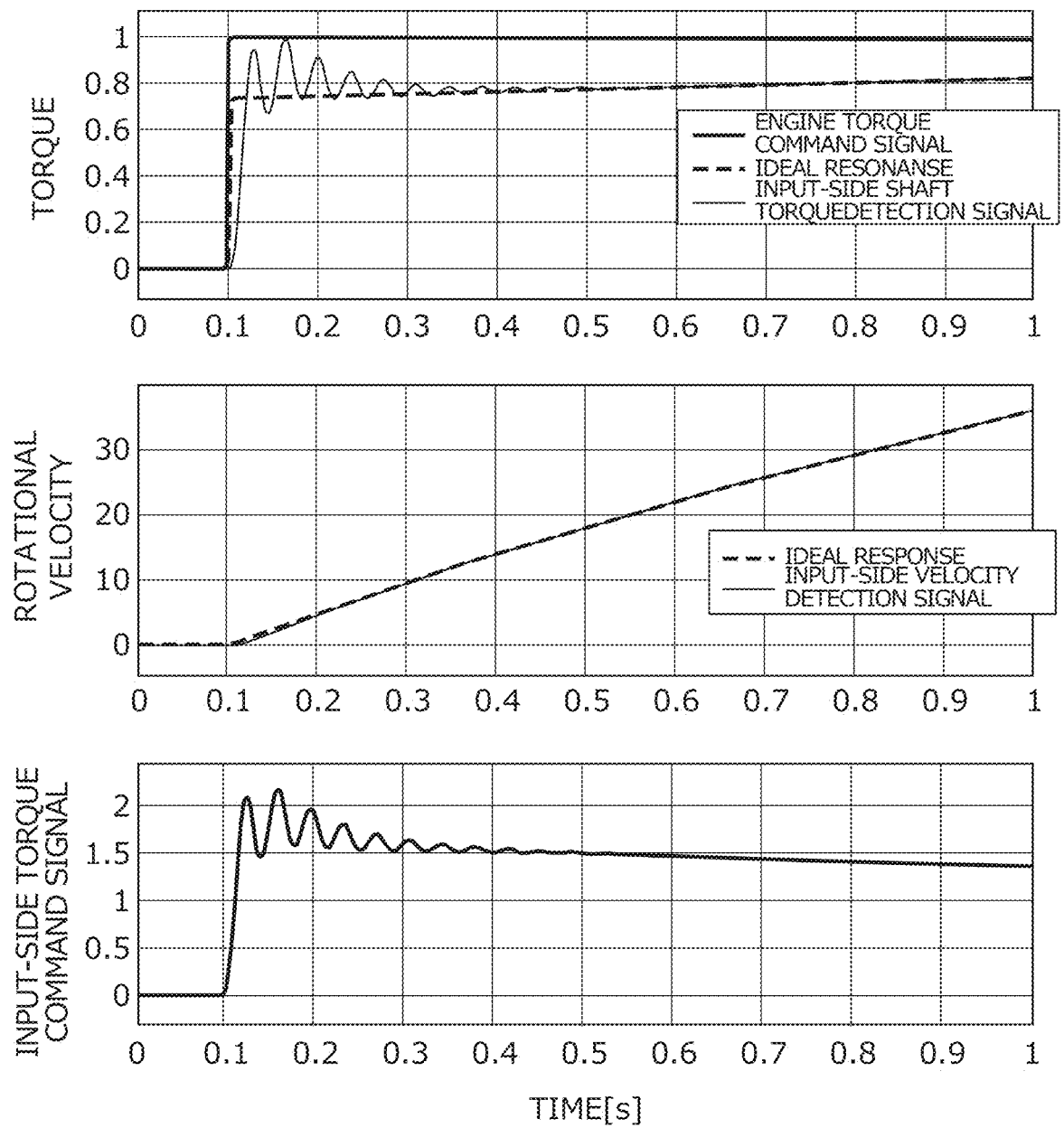
FIG. 7 is a view illustrating a result of a control performed by an input-side control device according to a comparative example.
Figure 8:
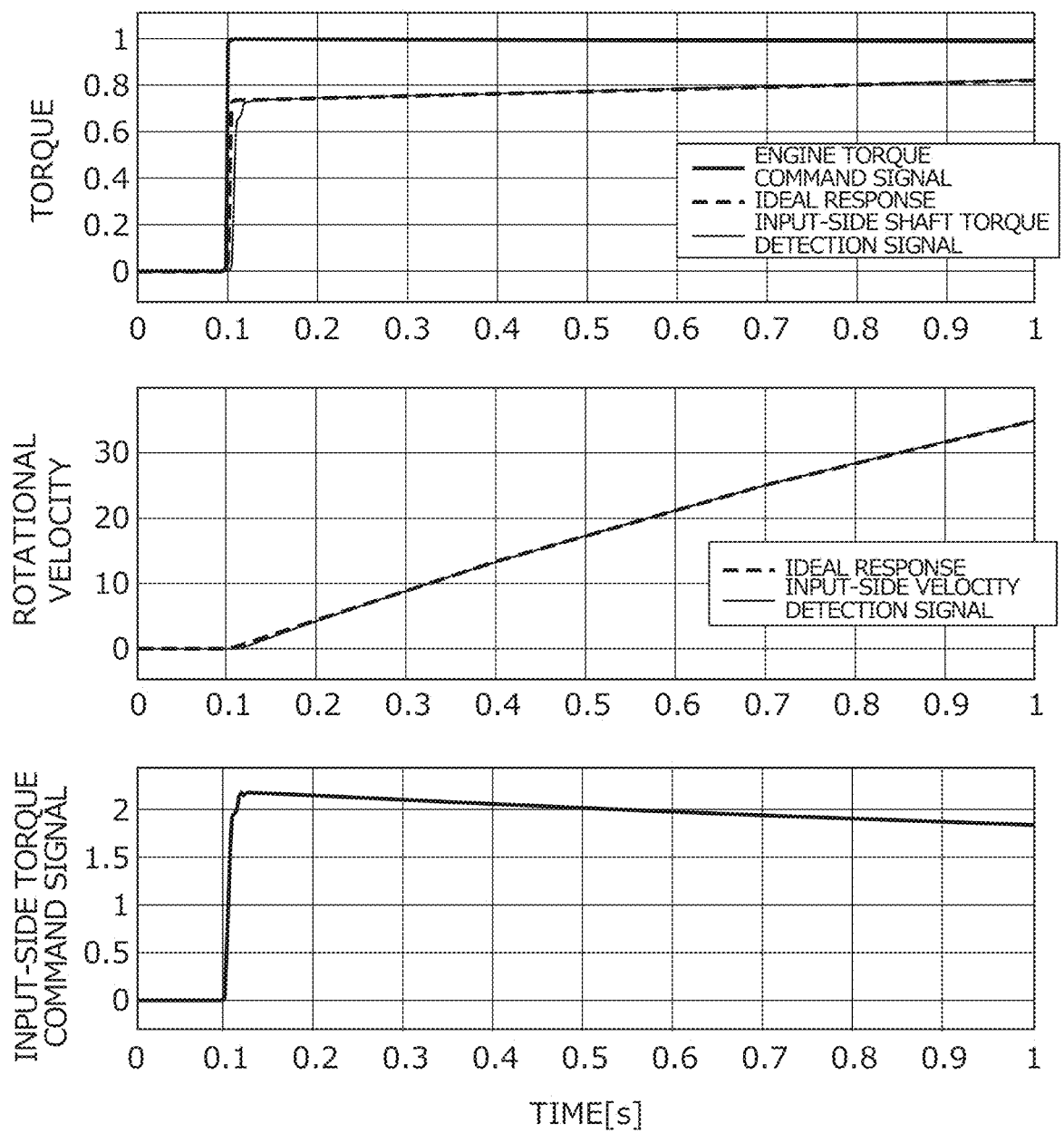
FIG. 8 is a view illustrating a result of a control performed by the input-side control device according to the example.

FIG. 7 is a view illustrating a result of a control performed by an input-side control device according to a comparative example. FIG. 8 is a view illustrating a result of the control performed by the input-side control device according to the example. In here, the input-side control device according to the comparative example is an input-side control device described in Patent Document 3 filed by the applicant of the present application. Specifically, the input-side control device 5 according to the example is set with the filter coefficients a1, a2, and b1 based on the above equations (13-1) to (13-3). FIGS. 7 and 8 illustrate cases where a moment of inertia of the input-side dynamometer 21 is 0.17 [kgm²], set inertia is 0.05 [kgm²], and the input-side control devices each perform the low-inertia realizing control.

FIGS. 7 and 8 illustrate responses when engine torque command signals to be applied to the input-side control devices are changed stepwise. Upper portions of FIGS. 7 and 8 each illustrate an actual response (thin solid line) of the engine torque command signal Tref (thick solid line) and the input-side shaft torque detection signal Tsh and an ideal response (thick dotted line) of the input-side shaft torque detection signal. Middle portions each illustrate an actual response (thin solid line) of the input-side velocity detection signal ω and an ideal response (thick dotted line) of the input-side velocity detection signal. Lower portions each illustrate the input-side torque command signal generated by the input-side control devices. In here, the ideal response refers to a response acquired when a moment of inertia of the input-side dynamometer 21 and set inertia are equal to each other.

As illustrated in FIG. 7, with the input-side control device according to the comparative example, where a waveform of the input-side velocity detection signal is approximately coincident with a waveform of the ideal response, it can be said that the low-inertia realizing control is achieved stably. However, there are overshoot and vibration in a waveform of the input-side shaft torque detection signal. On the other hand, as illustrated in FIG. 8, with the input-side control device according to the example, where a waveform of the input-side velocity detection signal is approximately coincident with a waveform of the ideal response, it is possible to stably achieve the low-inertia realizing control. With the input-side control device according to the example, where a waveform of the input-side shaft torque detection signal is approximately coincident with a waveform of the ideal response with neither overshoot nor vibration, it is possible to achieve the highly responsive, low-inertia realizing control.

Second Embodiment

Figure 9:
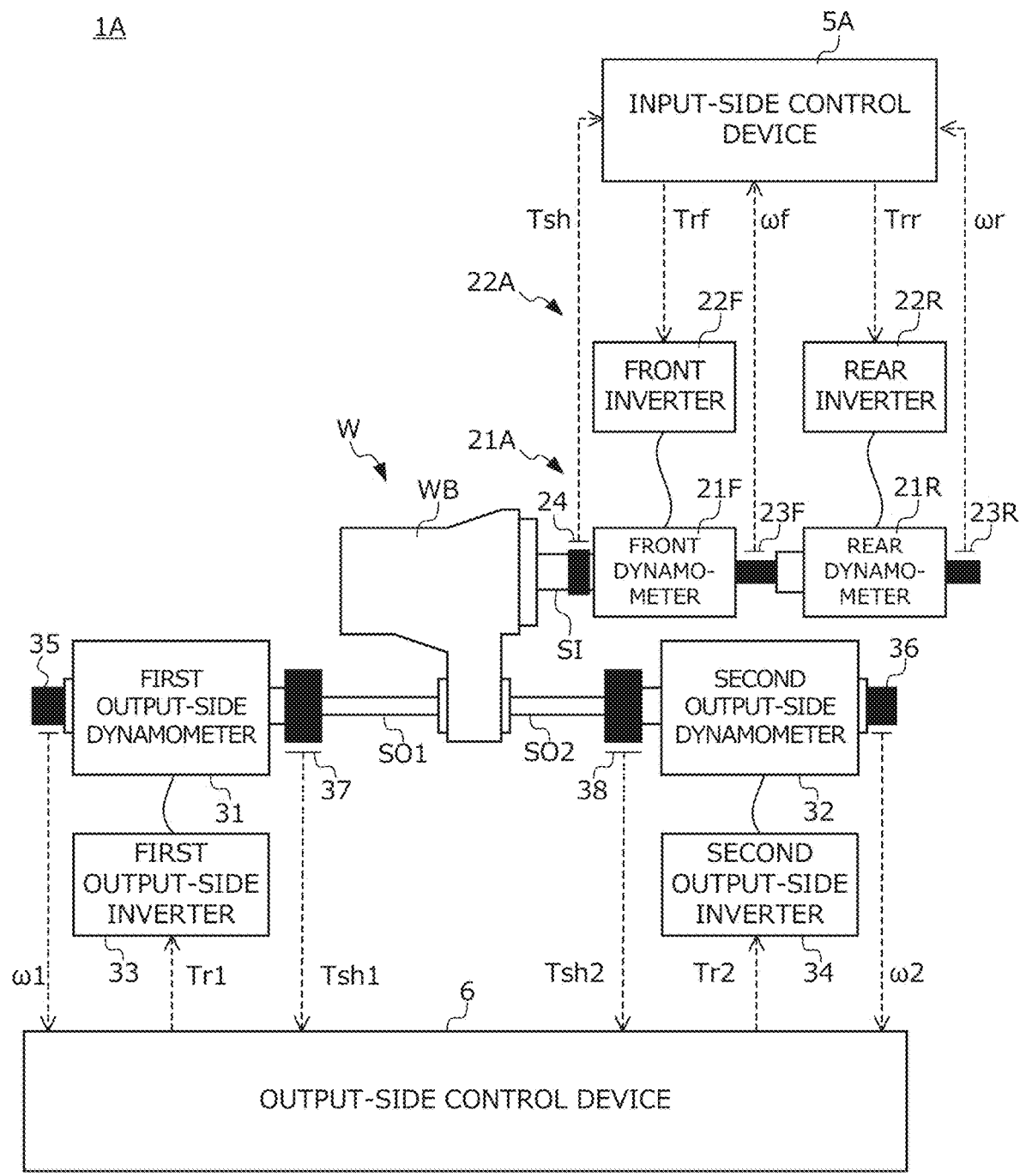
FIG. 9 is a view illustrating a configuration of a test system for a drive train, when the test system is applied with an input-side control device according to a second embodiment of the present invention.

A second embodiment of the present invention will now be described herein in detail with reference to the accompanying drawings. FIG. 9 is a view illustrating a configuration of a test system 1A for a drive train, when the test system 1A is applied with an input-side control device 5A according to the embodiment. In the test system 1A according to the embodiment, a configuration of the input-side control device 5A, an input-side dynamometer 21A, and an input-side inverter 22A mainly differs from the corresponding configuration of the test system 1 according to the first embodiment. Note that, in below descriptions, like reference numerals designating identical or corresponding components to those in the first embodiment, and their detailed descriptions are thus omitted.

The input-side dynamometer 21A is a tandem dynamometer having a configuration where a front dynamometer 21F coupled to the input shaft SI of the test sample W and, behind the front dynamometer 21F, a rear dynamometer 21R coupled to an output shaft of the front dynamometer 21F, are combined in series. The input-side inverter 22A includes a front inverter 22F that supplies electric power to the front dynamometer 21F, and a rear inverter 22R that supplies electric power to the rear dynamometer 21R. When a front torque command signal Trf generated through a procedure described later is inputted from the input-side control device 5A, the front inverter 22F supplies, to the front dynamometer 21F, electric power corresponding to the front torque command signal Trf. When a rear torque command signal Trr generated through a procedure described later is inputted from the input-side control device 5A, the rear inverter 22R supplies, to the rear dynamometer 21R, electric power corresponding to the rear torque command signal Trr.

A front encoder 23F generates a front velocity detection signal ωf corresponding to a rotational velocity of the output shaft of the front dynamometer 21F, and inputs the front velocity detection signal ωf to the input-side control device 5A. A rear encoder 23R generates a rear velocity detection signal ωr corresponding to a rotational velocity of an output shaft of the rear dynamometer 21R, and inputs the rear velocity detection signal ωr to the input-side control device 5A. The input-side control device 5A determines, as the input-side velocity detection signal ω, an average of the front velocity detection signal ωf and the rear velocity detection signal ωr.

The input-side control device 5A uses input signals such as the input-side velocity detection signal ω and the input-side shaft torque detection signal Tsh, follows a procedure described later with reference to FIG. 10 and other drawings, generates an input-side torque command signal for the input-side dynamometer 21A based on the front torque command signal Trf and the rear torque command signal Trr, and inputs the input-side torque command signal to the input-side dynamometer 21A. Therefore, the input-side control device 5A causes the input-side dynamometer 21A that is the tandem dynamometer to generate drive torque resembling drive torque of the engine in the completed vehicle mounted with the test sample W to drive the input shaft SI of the test sample W.

Figure 10:
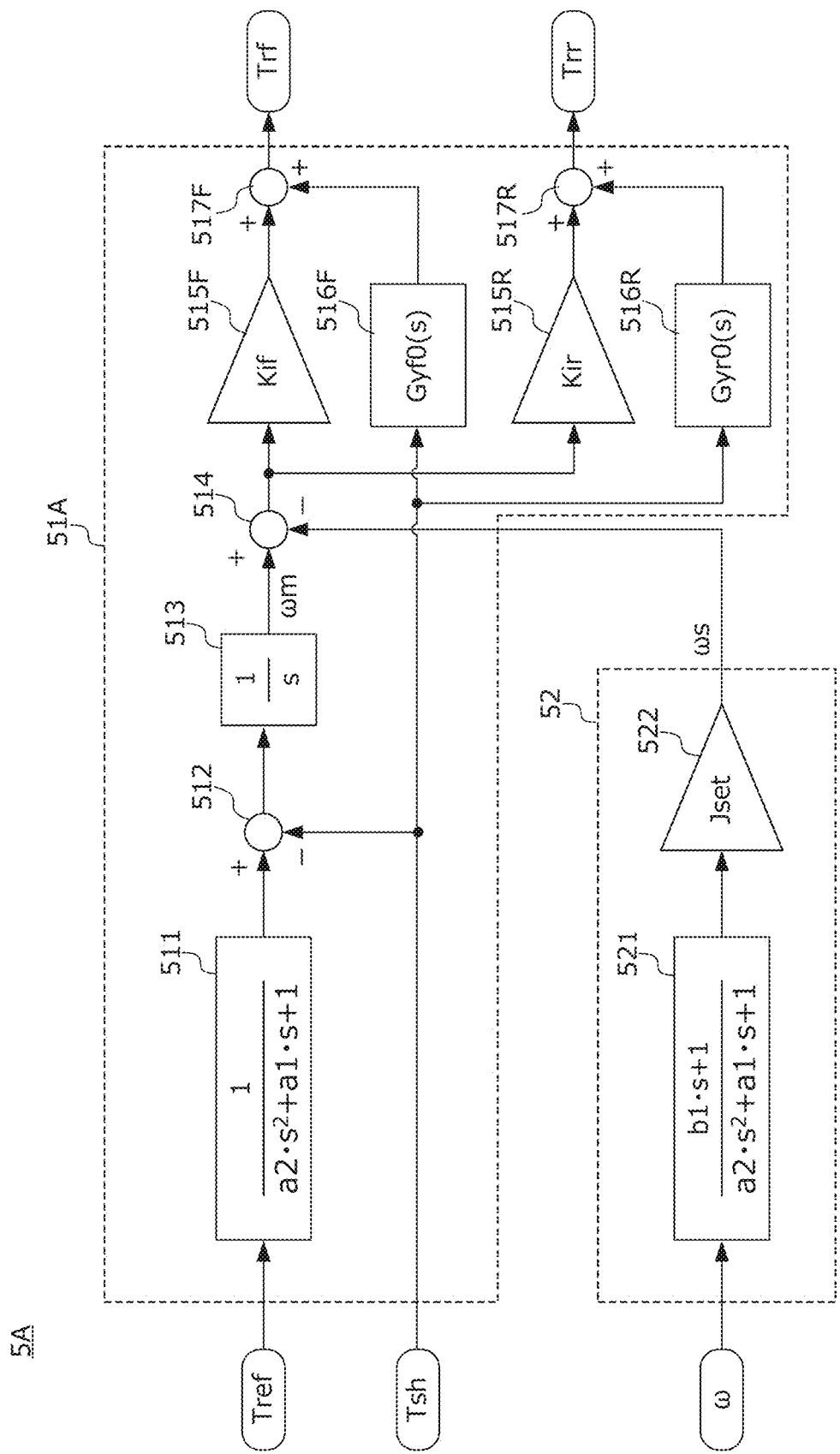
FIG. 10 is a block diagram illustrating a configuration of a control circuit in the input-side control device.

FIG. 10 is a block diagram illustrating a configuration of a control circuit in the input-side control device 5A. FIG. 10 particularly illustrates, in the control circuit configured in the input-side control device 5A, parts that perform an electrical inertia control for the input-side dynamometer.

The input-side control device 5A includes and uses a shaft torque controller 51A and the inertia compensator 52 to generate the front torque command signal Trf and the rear torque command signal Trr.

The shaft torque controller 51A generates the front torque command signal Trf and the rear torque command signal Trr based on the engine torque command signal Tref serving as a higher command signal with respect to the input-side torque command signal, the input-side shaft torque detection signal Tsh, and the inertia compensation signal cos generated by inertia compensator 52.

The shaft torque controller 51A includes and uses the first low-pass filter 511, the deviation operation part 512, the integration operation part 513, the subtraction part 514, a front gain multiplication part 515F, a rear gain multiplication part 515R, a front non-integration operation part 516F, a rear non-integration operation part 516R, a front addition part 517F, and a rear addition part 517R to generate the front torque command signal Trf and the rear torque command signal Trr.

The front gain multiplication part 515F multiplies the difference signal (ωm−ωs) generated by the subtraction part 514 by a predetermined front integration gain Kif to generate a front first control input signal, and inputs the front first control input signal to the front addition part 517F.

The rear gain multiplication part 515R multiplies the difference signal (ωm−ωs) generated by the subtraction part 514 by a predetermined rear integration gain Kir to generate a rear first control input signal, and inputs the rear first control input signal to the rear addition part 517R.

The front non-integration operation part 516F performs a front non-integration operation using a transfer function Gyf0(s) on the input-side shaft torque detection signal Tsh to generate a front second control input, and inputs the front second control input to the front addition part 517F. For the transfer function Gyf0(s) used in the front non-integration operation part 516F, one that is acquired by separating, from the predetermined transfer function Gyf(s) having the shaft torque control function, an integrator of the front integration gain Kif, as illustrated in a below equation (15), is used.

$$Gyf(s) = \frac{Kif}{s} + Gyf0(s) \quad (15)$$

The rear non-integration operation part 516R performs a rear non-integration operation using a transfer function Gyr0(s) on the input-side shaft torque detection signal Tsh to generate a rear second control input, and inputs the rear second control input to the rear addition part 517R. For the transfer function Gyr0(s) used in the rear non-integration operation part 516R, one that is acquired by separating, from the predetermined transfer function Gyr(s) having the shaft torque control function, an integrator of the rear integration gain Kir, as illustrated in a below equation (16), is used. The transfer functions Gyf(s) and Gyr(s) having the shaft torque control function, as respectively illustrated in the above equation (15) and a below equation (16) are designed, as described with reference to FIG. 5, based on the control system design method such as the μ design method or the H∞ control design method.

$$Gyr(s) = \frac{Kir}{s} + Gyr0(s) \quad (16)$$

The front addition part 517F inputs a sum of the front first control input signal generated by the front gain multiplication part 515F and the front second control input signal generated by the front non-integration operation part 516F, as the front torque command signal Trf, to the front inverter 22F.

The rear addition part 517R inputs a sum of the rear first control input signal generated by the rear gain multiplication part 515R and the rear second control input signal generated by the rear non-integration operation part 516R, as the rear torque command signal Trr, to the rear inverter 22R.

In the input-side control device 5A configured as described above, the filter coefficients a1, a2, and b1 that characterize the input-output characteristics of the first low-pass filter 511 and the second low-pass filter 521 are determined through a procedure similar to that according to the first embodiment. The three filter coefficients a1, a2, and b1 are set to satisfy the polynomial Pc(s) illustrated in the above equation (12) where the characteristic polynomial of the closed-loop transfer function used in the control circuit configured in the shaft torque controller 51A and the inertia compensator 52 is characterized by the response frequency fc and the coefficients c1, c2, and c3. More specifically, the filter coefficients a1, a2, and b1 used in the input-side control device 5A according to the example are set by below equations (17-1) to (17-3) derived by replacing the integration gain Ki in the above equations (13-1) to (13-3) with a sum of the front integration gain Kif and the rear integration gain Kir.

$$(2\pi fc)^2 \cdot a2 = \frac{c3 \cdot (J2 + Jset) \cdot (Kif + Kir)}{(J1 + J2) \cdot 2\pi fc} \quad (17\text{-}1)$$

$$2\pi fc \cdot a1 = \frac{(J2 + Jset) \cdot (Kif + Kir) \cdot (-c3 \cdot J2 \cdot (Kif + Kir) + c2 \cdot (J1 + J2) \cdot 2\pi fc)}{(J1 + J2)^2 \cdot (2\pi fc)^2} \quad (17\text{-}2)$$

$$2\pi fc \cdot b1 = [c3 \cdot J2^2 \cdot (J2 + Jset) \cdot (Kif + Kir)^3 + \\ (J1 + J2) \cdot 2\pi fc \cdot \{-c2 \cdot J2 \cdot (J2 + Jset) \cdot (Kif + Kir)^2 + \\ (J1 + J2) \cdot 2\pi fc \cdot (c1 \cdot (J2 + Jset) \cdot (Kif + Kir) - \\ (J1 + J2) \cdot 2\pi fc)\}]/[(J1 + J2)^2 \cdot \\ Jset \cdot (Kif + Kir) \cdot (2\pi fc)^2] \quad (17\text{-}3)$$

Figure 11:
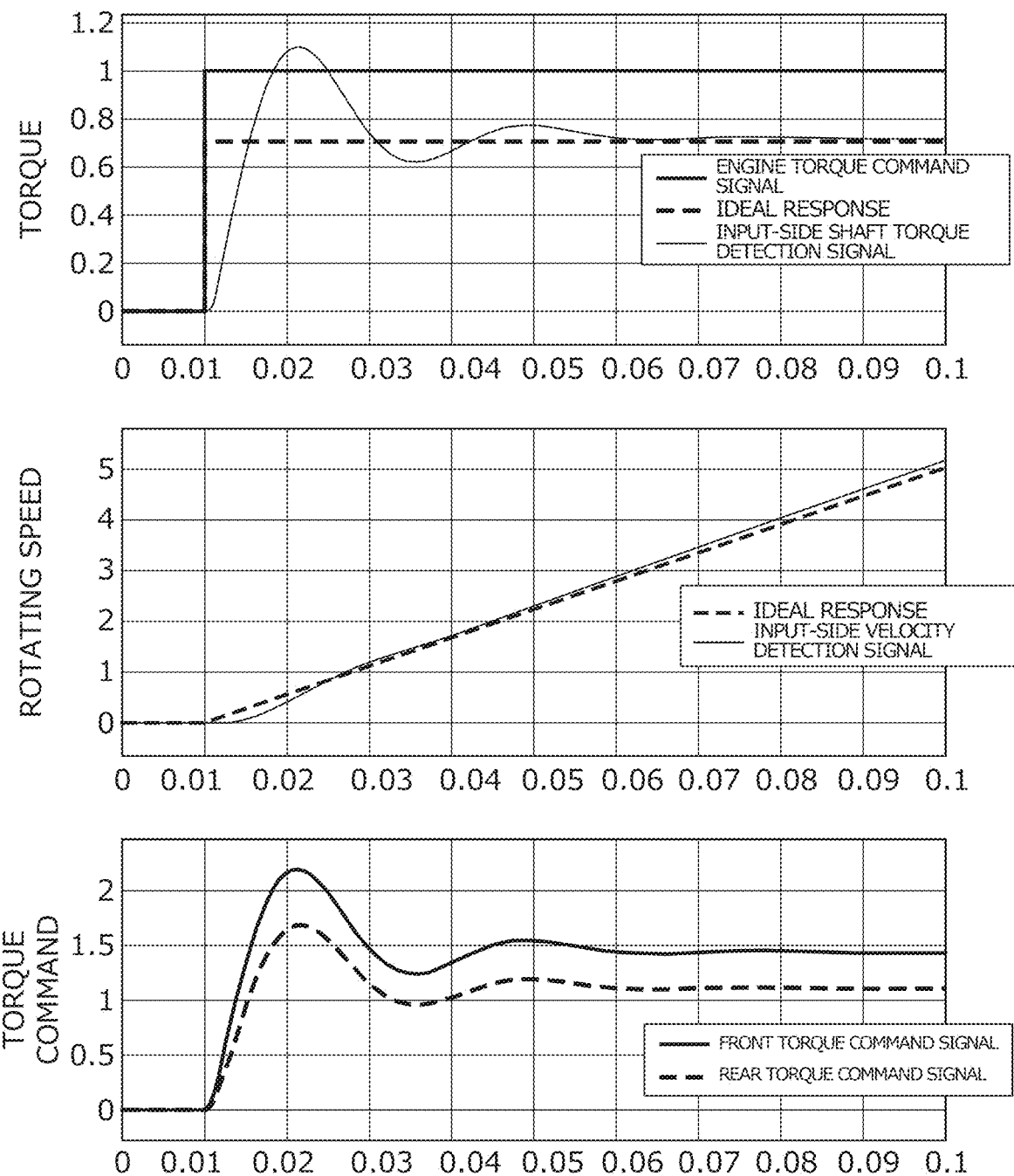
FIG. 11 is a view illustrating a result of a control performed by an input-side control device according to a comparative example.
Figure 12:
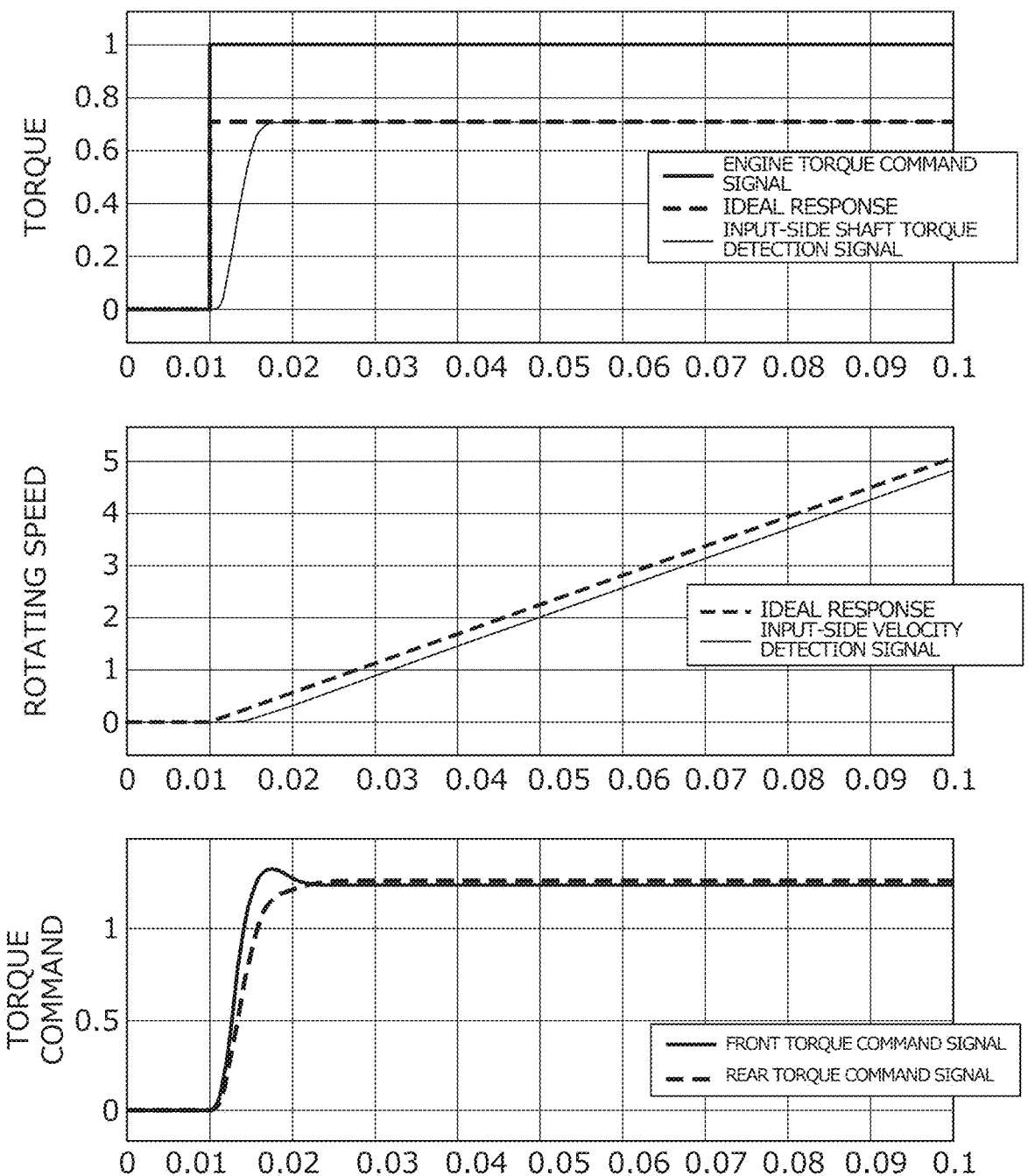
FIG. 12 is a view illustrating a result of a control performed by the input-side control device according to the example.

FIG. 11 is a view illustrating a result of a control performed by an input-side control device according to a comparative example. FIG. 12 is a view illustrating a result of the control performed by the input-side control device 5A according to the example. Here, the input-side control device according to the comparative example is an input-side control device acquired when a resonance suppression control in a tandem dynamometer described in WO 2013/105375 filed by the applicant of the present application and an electrical inertia control described in Patent Document 3 filed by the applicant of the present application are combined with each other. Specifically, the input-side control device 5A according to the example is set with the filter coefficients a1, a2, and b1 based on the above equations (17-1) to (17-3). FIGS. 11 and 12 illustrate cases where a sum of moments of inertia of the front dynamometer 21F and the rear dynamometer 21R is 0.3 [kgm$^2$], inertia of test sample is 0.12 [kgm$^2$], set inertia is 0.05 [kgm$^2$], and the input-side control devices each perform the low-inertia realizing control.

FIGS. 10 and 11 illustrate responses when engine torque command signals to be applied to the input-side control devices are changed stepwise. Upper portions of FIGS. 10 and 11 each illustrate an actual response (thin solid line) of the engine torque command signal Tref (thick solid line) and the input-side shaft torque detection signal Tsh and an ideal response (thick dotted line) of the input-side shaft torque detection signal. Middle portions each illustrate an actual response (thin solid line) of the input-side velocity detection signal ω and an ideal response (thick dotted line) of the input-side velocity detection signal. Lower portions each illustrate the front torque command signal Trf (thick solid line) and the rear torque command signal Trr (thick dotted line) generated by the input-side control devices. In here, the ideal response refers to a response acquired when a moment of inertia of the input-side dynamometer 21A and set inertia are equal to each other.

As illustrated in FIG. 10, with the input-side control device according to the comparative example, where a waveform of the input-side velocity detection signal is approximately coincident with a waveform of the ideal response, it can be said that the low-inertia realizing control is achieved stably. However, there are overshoot and vibration in a waveform of the input-side shaft torque detection signal. In the input-side control device according to the comparative example, there is a large difference between the front torque command signal and the rear torque command signal, leading to an unbalanced torque command signal.

On the other hand, with the input-side control device according to the example, as illustrated in FIG. 11, where a waveform of the input-side velocity detection signal is approximately coincident with a waveform of the ideal response, it is possible to stably achieve the low-inertia realizing control. With the input-side control device according to the example, where a waveform of the input-side shaft torque detection signal is approximately coincident with s waveform of the ideal response with neither overshoot nor vibration, it is possible to achieve the highly responsive, low-inertia realizing control. With the input-side control device according to the example, where a difference between the front torque command signal and the rear torque command signal is smaller than the difference that can be found in the comparative example, as illustrated in FIG. 10, it is possible to achieve well-balanced controls for the front dynamometer and the rear dynamometer.

Although the first and second embodiments of the present invention have been described, the present invention is not limited to the embodiments. The present invention may be appropriately altered in detailed configuration within the scope of the present invention.

EXPLANATION OF REFERENCE NUMERALS 1, 1A Test system
SI Input shaft
SO1, SO2 Output shaft
W Test sample
21, 21A Input-side dynamometer (dynamometer)
21F Front dynamometer (first dynamometer)
21R Rear dynamometer (second dynamometer)
22, 22A Input-side inverter (inverter)
23 Input-side encoder (velocity detector)
24 Input-side shaft torque meter (shaft torque detector)
5, 5A Input-side control device (dynamometer control device)
51, 51A Shaft torque controller
511 First low-pass filter
513 Integration operation part
515 Gain multiplication part 515F Front gain multiplication part (first gain multiplication part)
515R Rear gain multiplication part (second gain multiplication part)
516 Non-integration operation part
516F Front non-integration operation part (first non-integration operation part)
516R Rear non-integration operation part (second non-integration operation part)
517 Addition part
517F Front addition part (first addition part)
517R Rear addition part (second addition part)
52 Inertia compensator
521 Second low-pass filter

The invention claimed is:

1. A dynamometer control device used in a test system including
a dynamometer coupled to an input shaft of a test sample including the input shaft and an output shaft,
an inverter that supplies, to the dynamometer, electric power corresponding to a torque command signal,
a velocity detector that generates a velocity detection signal corresponding to a rotational velocity of the dynamometer, and
a shaft torque detector that generates a shaft torque detection signal corresponding to shaft torque acting on the input shaft,
the dynamometer control device using a higher command signal with respect to the torque command signal, the velocity detection signal, and the shaft torque detection signal to generate the torque command signal,
the dynamometer control device comprising:
a shaft torque controller that generates the torque command signal based on the higher command signal and the shaft torque detection signal; and
an inertia compensator that feeds back, to the shaft torque controller, an inertia compensation signal generated by multiplying a set inertia value by the velocity detection signal,
the shaft torque controller including a first low-pass filter that, from the higher command signal, allows a high-frequency component to decay and a low-frequency component to pass, and
the inertia compensator including a second low-pass filter that, from the velocity detection signal, allows a high-frequency component to decay and a low-frequency component to pass.

2. The dynamometer control device according to claim 1, wherein input-output characteristics of the first low-pass filter and the second low-pass filter are set to satisfy a below polynomial Pc(s) where a characteristic polynomial of a closed-loop transfer function used in a control circuit configured in the shaft torque controller and the inertia compensator is characterized by a response frequency fc that is set lower than a resonance frequency of the input shaft and predetermined coefficients c1, c2, and c3.

$$Pc(s) = 1 + c1\left(\frac{s}{2\pi fc}\right) + c2\left(\frac{s}{2\pi fc}\right)^2 + c3\left(\frac{s}{2\pi fc}\right)^3. \quad (1)$$

3. The dynamometer control device according to claim 2, wherein a denominator polynomial of a transfer function used in the first low-pass filter is equal to a denominator polynomial of a transfer function used in the second low-pass filter, and a degree of a numerator polynomial of the transfer function used in the second low-pass filter is greater than a degree of a numerator polynomial of the transfer function used in the first low-pass filter.

4. The dynamometer control device according to claim 3, wherein the shaft torque controller includes
a deviation operation part that calculates a deviation between the higher command signal that has passed the first low-pass filter and the shaft torque detection signal,
an integration operation part that integrates the deviation,
a gain multiplication part that multiplies, by a predetermined integration gain, one that is acquired by subtracting the inertia compensation signal from an output signal of the integration operation part,
a non-integration operation part that performs a non-integration operation on the deviation, and
an addition part that determines, as the torque command signal, a sum of an output signal of the non-integration operation part and an output signal of the gain multiplication part, and
a transfer function Ge0(s) used in the non-integration operation part, where Ki is the integration gain, s is a Laplace operator, and Ge(s) is a transfer function that outputs a torque command signal that causes, when the deviation is inputted, the deviation to disappear, is set to satisfy a below equation.

$$Ge(s) = \frac{Ki}{s} + Ge0(s). \quad (5)$$

5. The dynamometer control device according to claim 4, wherein the transfer function Ge(s) is designed based on a control system design method that is referred to as a µ design method or an H∞ control design method.

6. The dynamometer control device according to claim 3, wherein the dynamometer is a tandem dynamometer including a first dynamometer coupled to the input shaft, and a second dynamometer coupled to an output shaft of the first dynamometer, and
the torque command signal contains a first torque command signal for the first dynamometer, and a second torque command signal for the second dynamometer.

7. The dynamometer control device according to claim 6, wherein the shaft torque controller includes
a deviation operation part that calculates a deviation between the higher command signal that has passed the first low-pass filter and the shaft torque detection signal,
an integration operation part that integrates the deviation,
a first gain multiplication part that multiplies, by a predetermined first integration gain, one that is acquired by subtracting the inertia compensation signal from an output signal of the integration operation part,
a second gain multiplication part that multiplies, by a predetermined second integration gain, one that is acquired by subtracting the inertia compensation signal from the output signal of the integration operation part,
a first non-integration operation part that performs a first non-integration operation on the shaft torque detection signal,
a second non-integration operation part that performs a second non-integration operation on the shaft torque detection signal, a first addition part that determines, as the first torque command signal, a sum of an output signal of the first non-integration operation part and an output signal of the first gain multiplication part, and a second addition part that determines, as the second torque command signal, a sum of an output signal of the second non-integration operation part and an output signal of the second gain multiplication part, a transfer function Gyf0(s) used in the first non-integration operation part, where Kif is the first integration gain, s is a Laplace operator, and Gyf(s) is a transfer function that outputs a torque command signal that causes, when the shaft torque detection signal is inputted, the deviation to disappear, is set to satisfy a below equation (7-1), and a transfer function Gyr0(s) used in the second non-integration operation part, where Kir is the second integration gain, and Gyr(s) is a transfer function that outputs a torque command signal that causes, when the shaft torque detection signal is inputted, the deviation to disappear, is set to satisfy a below equation (7-2).

$$Gyf(s) = \frac{Kif}{s} + Gyf0(s) \qquad (7\text{-}1)$$

$$Gyr(s) = \frac{Kir}{s} + Gyr0(s). \qquad (7\text{-}2)$$

8. The dynamometer control device according to claim 7, wherein the transfer functions Gyf(s) and Gyr(s) are designed based on a control system design method that is referred to as a μ design method or an H∞ control design method.

9. The dynamometer control device according to claim 2, wherein the shaft torque controller includes
    a deviation operation part that calculates a deviation between the higher command signal that has passed the first low-pass filter and the shaft torque detection signal,
    an integration operation part that integrates the deviation,
    a gain multiplication part that multiplies, by a predetermined integration gain, one that is acquired by subtracting the inertia compensation signal from an output signal of the integration operation part,
    a non-integration operation part that performs a non-integration operation on the deviation, and
    an addition part that determines, as the torque command signal, a sum of an output signal of the non-integration operation part and an output signal of the gain multiplication part, and
    a transfer function Ge0(s) used in the non-integration operation part, where Ki is the integration gain, s is a Laplace operator, and Ge(s) is a transfer function that outputs a torque command signal that causes, when the deviation is inputted, the deviation to disappear, is set to satisfy a below equation.

$$Ge(s) = \frac{Ki}{s} + Ge0(s). \qquad (4)$$

10. The dynamometer control device according to claim 9, wherein the transfer function Ge(s) is designed based on a control system design method that is referred to as a μ design method or an H∞ control design method.

11. The dynamometer control device according to claim 2, wherein the dynamometer is a tandem dynamometer including a first dynamometer coupled to the input shaft, and a second dynamometer coupled to an output shaft of the first dynamometer, and
    the torque command signal contains a first torque command signal for the first dynamometer, and a second torque command signal for the second dynamometer.

12. The dynamometer control device according to claim 11, wherein the shaft torque controller includes
    a deviation operation part that calculates a deviation between the higher command signal that has passed the first low-pass filter and the shaft torque detection signal,
    an integration operation part that integrates the deviation,
    a first gain multiplication part that multiplies, by a predetermined first integration gain, one that is acquired by subtracting the inertia compensation signal from an output signal of the integration operation part,
    a second gain multiplication part that multiplies, by a predetermined second integration gain, one that is acquired by subtracting the inertia compensation signal from the output signal of the integration operation part,
    a first non-integration operation part that performs a first non-integration operation on the shaft torque detection signal,
    a second non-integration operation part that performs a second non-integration operation on the shaft torque detection signal,
    a first addition part that determines, as the first torque command signal, a sum of an output signal of the first non-integration operation part and an output signal of the first gain multiplication part, and
    a second addition part that determines, as the second torque command signal, a sum of an output signal of the second non-integration operation part and an output signal of the second gain multiplication part,
    a transfer function Gyf0(s) used in the first non-integration operation part, where Kif is the first integration gain, s is a Laplace operator, and Gyf(s) is a transfer function that outputs a torque command signal that causes, when the shaft torque detection signal is inputted, the deviation to disappear, is set to satisfy a below equation (6-1), and
    a transfer function Gyr0(s) used in the second non-integration operation part, where Kir is the second integration gain, and Gyr(s) is a transfer function that outputs a torque command signal that causes, when the shaft torque detection signal is inputted, the deviation to disappear, is set to satisfy a below equation (6-2).

$$Gyf(s) = \frac{Kif}{s} + Gyf0(s) \qquad (6\text{-}1)$$

$$Gyr(s) = \frac{Kir}{s} + Gyr0(s). \qquad (6\text{-}2)$$

13. The dynamometer control device according to claim 12, wherein the transfer functions Gyf(s) and Gyr(s) are designed based on a control system design method that is referred to as a μ design method or an H∞ control design method.

14. The dynamometer control device according to claim 1, wherein a denominator polynomial of a transfer function used in the first low-pass filter is equal to a denominator polynomial of a transfer function used in the second low-pass filter, and
- a degree of a numerator polynomial of the transfer function used in the second low-pass filter is greater than a degree of a numerator polynomial of the transfer function used in the first low-pass filter.

15. The dynamometer control device according to claim 1, wherein the shaft torque controller includes
- a deviation operation part that calculates a deviation between the higher command signal that has passed the first low-pass filter and the shaft torque detection signal,
- an integration operation part that integrates the deviation,
- a gain multiplication part that multiplies, by a predetermined integration gain, one that is acquired by subtracting the inertia compensation signal from an output signal of the integration operation part,
- a non-integration operation part that performs a non-integration operation on the deviation, and
- an addition part that determines, as the torque command signal, a sum of an output signal of the non-integration operation part and an output signal of the gain multiplication part, and
- a transfer function Ge0(s) used in the non-integration operation part, where Ki is the integration gain, s is a Laplace operator, and Ge(s) is a transfer function that outputs a torque command signal that causes, when the deviation is inputted, the deviation to disappear, is set to satisfy a below equation.

$$Ge(s) = \frac{Ki}{s} + Ge0(s). \qquad (2)$$

16. The dynamometer control device according to claim 15, wherein the transfer function Ge(s) is designed based on a control system design method that is referred to as a μ design method or an H∞ control design method.

17. The dynamometer control device according to claim 1, wherein the dynamometer is a tandem dynamometer including a first dynamometer coupled to the input shaft, and a second dynamometer coupled to an output shaft of the first dynamometer, and
- the torque command signal contains a first torque command signal for the first dynamometer, and a second torque command signal for the second dynamometer.

18. The dynamometer control device according to claim 17, wherein the shaft torque controller includes
- a deviation operation part that calculates a deviation between the higher command signal that has passed the first low-pass filter and the shaft torque detection signal,
- an integration operation part that integrates the deviation,
- a first gain multiplication part that multiplies, by a predetermined first integration gain, one that is acquired by subtracting the inertia compensation signal from an output signal of the integration operation part,
- a second gain multiplication part that multiplies, by a predetermined second integration gain, one that is acquired by subtracting the inertia compensation signal from the output signal of the integration operation part,
- a first non-integration operation part that performs a first non-integration operation on the shaft torque detection signal,
- a second non-integration operation part that performs a second non-integration operation on the shaft torque detection signal,
- a first addition part that determines, as the first torque command signal, a sum of an output signal of the first non-integration operation part and an output signal of the first gain multiplication part, and
- a second addition part that determines, as the second torque command signal, a sum of an output signal of the second non-integration operation part and an output signal of the second gain multiplication part,
- a transfer function Gyf0(s) used in the first non-integration operation part, where Kif is the first integration gain, s is a Laplace operator, and Gyf(s) is a transfer function that outputs a torque command signal that causes, when the shaft torque detection signal is inputted, the deviation to disappear, is set to satisfy a below equation (3-1), and
- a transfer function Gyr0(s) used in the second non-integration operation part, where Kir is the second integration gain, and Gyr(s) is a transfer function that outputs a torque command signal that causes, when the shaft torque detection signal is inputted, the deviation to disappear, is set to satisfy a below equation (3-2).

$$Gyf(s) = \frac{Kif}{s} + Gyf0(s) \qquad (3\text{-}1)$$

$$Gyr(s) = \frac{Kir}{s} + Gyr0(s). \qquad (3\text{-}2)$$

19. The dynamometer control device according to claim 18, wherein the transfer functions Gyf(s) and Gyr(s) are designed based on a control system design method that is referred to as a μ design method or an H∞ control design method.

* * * * *